US005771235A

United States Patent [19]

Tang et al.

[11] Patent Number: 5,771,235
[45] Date of Patent: Jun. 23, 1998

[54] SCALABLE CSMA/CD REPEATER

[75] Inventors: Wen-Tsung Tang, Santa Clara; W. Paul Sherer, Sunnyvale, both of Calif.

[73] Assignee: 3Com Corporation, Santa Clara, Calif.

[21] Appl. No.: 641,619

[22] Filed: May 1, 1996

[51] Int. Cl.$^6$ ................................................. H04L 12/413
[52] U.S. Cl. ........................... 370/446; 370/448; 370/501
[58] Field of Search .................................. 370/407, 419, 370/425, 445, 446, 447, 448, 462, 492, 501; 395/200.82; 315/212

[56] References Cited

U.S. PATENT DOCUMENTS

| | | | |
|---|---|---|---|
| 4,606,023 | 8/1986 | Dragoo | 370/446 |
| 4,776,041 | 10/1988 | Husbands | 359/120 |
| 5,355,375 | 10/1994 | Christensen | 370/446 |
| 5,436,617 | 7/1995 | Adams et al. | 370/254 |

OTHER PUBLICATIONS

"Local and Metropolitan Area Networks—8023 Supplements," IEEE Standards for Local and Metropolitan Area Networks 802.3u, pp. 203–233, Oct. 26, 1995.

*Primary Examiner*—Hassan Kizou
*Attorney, Agent, or Firm*—Mark A. Haynes; Wilson, Sonsini, Goodrich & Rosati

[57] ABSTRACT

A scalable CSMA/CD repeater is based on polling and collision resolution logic, and slot time and interframe gap negotiation logic controlled by the repeater itself. The repeater based polling and collision resolution provides central control of the backoff and retry algorithm of each connected MAC unit. Thus, the MAC unit does not rely on random backoff mechanisms that significantly degrade performance of prior art systems. Furthermore, the retry by a MAC unit after a collision is managed by commands received from the collision resolution logic in the repeater. The repeater based collision resolution logic ensures that all ports involved in a collision have a fair opportunity to forward a packet without being blocked before enabling all the ports in the network to freely compete again. Furthermore, the negotiation of slot time and interframe gap allows for tight control of delay parameters in the network which are involved in collision resolution and scaling of the technology with increasing MAC unit processing speeds.

22 Claims, 21 Drawing Sheets

HALF DU. W/ FRAME BUFFER

W/ FULL DUPLEX

W/ FULL DUPLEX AND FRAME BUFFER

W/ FULL DUPLEX AND FRAME BUFFER

SCALABLE CSMA/CD REPEATER

BACKGROUND OF THE INVENTION

1. Field of the Invention

The present invention relates to network intermediate system devices, such as repeaters; and more particularly to an improved scalable repeater architecture for carrier sense multiple access with collision detection (CSMA/CD) network protocols.

2. Description of Related Art

A CSMA/CD protocol has been widely adopted in a 10 megabit per second Mbs local area network standard known as Ethernet (ANSI/IEEE Standard 802.3). The 10 Mbps standard has been extended to 100 Mbs embodiments, as set forth in IEEE Standard 802.3u. Furthermore, the investigations are underway to extend the data rate of the CSMA/CD protocol even higher, for example up to 1 gigabit per second.

According to the CSMA/CD protocol, an end station has a medium access control (MAC) unit which, in order to transmit a packet first senses the status of the transmission medium to which it is attached to determine whether a carrier is present or not. If no carrier is present, then the MAC unit begins transmission of the packet. Because of the delay from transmission of a packet until a packet is received by a remote end station in the network, the possibility of collisions occurs. According to the CSMA/CD protocol, the MAC unit at each end station is capable of detecting such collisions. Thus, after beginning to transmit a packet, the MAC unit will continue to monitor the transmission medium to detect collisions. In order to ensure that all collisions are detected, the MAC unit must monitor for collisions during the transmission of the entire packet. Furthermore, if the packet is relatively short, there is a possibility that collisions may occur even after the MAC unit is finished sending the short packet. Thus, the MAC unit must continue to monitor for collisions for a finite amount of time after it begins transmission, often referred to as a slot time.

For prior art systems, the slot time is the worse case round trip delay from the time a MAC unit starts to send a packet, to the time it is received by a MAC unit the maximum allowable distance away from the sending MAC unit, plus the amount of processing delay required at the receiving MAC to return a packet back to the original MAC unit. Most CSMA/CD networks being utilized are based on a central repeater, to which each end station is coupled. In the case of a repeater based network, the slot time is equal to two times the worse case allowable round trip cable delay between the repeater and the MAC unit, plus two times the maximum media dependent interface MDI to MDI delay through the repeater, plus two times the maximum medium independent interface MII to MDI delay through the MAC unit, plus the maximum MDI to MDI delay within the MAC unit.

The collisions in CSMA/CD networks result in the frame fragments known as collision fragments being propagated through the network, which have significant length based on the slot time for the network. In very high data rate networks, such as 100 Mbps networks, the amount of data in any collision fragment can be quite large. Furthermore, when a high speed network, such as 1 Gbs network is coupled to a lower speed network, such as a 100 Mbs or 10 Mbs network, the collision fragments will expand in length as they cross the high to low data rate barrier.

Thus, it can be seen that the consequences of collisions in the CSMA/CD based network can result in a significant amount of data being transmitted in the network at the expense of efficient use of the network. Prior art systems have developed to improve the efficiency of CSMA/CD networks. However, the prior art approaches come at the expense of more complicated network intermediate devices in place of repeaters. Thus, high speed switches are utilized where repeaters had been used in the past. Alternatively, other protocols have been developed which rely on more complex hardware, such as asynchronous transfer mode ATM.

Accordingly, it is desirable to provide an improved repeater for CSMA/CD networks which minimizes the consequences of collisions in such networks. Thus, it is desirable to provide an improved repeater which operates according to a scheme which is scalable with cable delay (varying cable type and length), with data rate and with hardware processing speeds without changing the algorithm, which provides a more efficient and fair backoff scheme to reduce waste of bandwidth caused by the random backoff of standard CSMA/CD MAC units, and further which optimizes the delays inherent in the network scheme required for management and resolution of collisions. Furthermore, it is desirable for such system to operate without increasing the minimum frame size applied to the network, and without propagating inflated collision fragments over the high speed to lower speed interfaces in the network. In addition, it is desirable to provide such improved system without requiring complex changes to existing MAC units.

SUMMARY OF THE INVENTION

The present invention provides a scalable CSMA/CD repeater which is based on polling and collision resolution logic, and slot time and interframe gap negotiation logic controlled by the repeater itself. The repeater based polling and collision resolution provides central control of the backoff and retry algorithm of each connected MAC unit. Thus, the MAC unit does not rely on random backoff mechanisms that significantly degrade performance of prior art systems. Furthermore, the retry by a MAC unit after a collision is managed by commands received from the collision resolution logic in the repeater. The repeater based collision resolution logic ensures that all ports involved in a collision have a fair opportunity to forward a packet without being blocked before enabling all the ports in the network to freely compete again. Furthermore, the negotiation of slot time and interframe gap allows for tight control of delay parameters in the network which are involved in collision resolution and scaling of the technology with increasing MAC unit processing speeds.

Accordingly, the present invention can be characterized as a network device comprising a plurality of ports and a repeater unit. The repeater unit includes logic coupled to the plurality of ports which monitors activity on the plurality of ports (i) to transmit a packet received without collision on one port (port N) to all other enabled ports (ports ALLxN) in the plurality of ports, and (ii) to detect a collision between packets received on a set of colliding ports in the plurality of ports, to record identifiers of the ports in the set of colliding ports, and to issue commands to end stations coupled to ports in the set of colliding ports to resolve the collision. The commands assign opportunities to the ports in the set of colliding ports to send a packet without collision. Furthermore, the network device includes a delay parameter negotiation logic, coupled to the repeater unit and to the plurality of ports, which communicates with end stations coupled to the plurality of ports to determine the delay parameters for use by the repeater unit and by MAC units in the network to detect and resolve collisions. These delay parameters include slot time and the interframe gap parameters critical to high throughput data networks.

The network device including a repeater unit according to the present invention is scalable to systems involving half duplex or full duplex communications channels, and to systems which include an optional frame buffer with the repeater unit to improve throughput of data in the network.

The commands issued by the repeater unit are implemented according to one aspect of the invention in the start-of-frame and end-of-frame delimiters of frames being transmitted in the network. In the half duplex embodiment, when the repeater unit detects a collision, logic in the repeater unit operates to jam the plurality of ports in response to the detection of the collision by transmitting jam packets to the plurality ports. The commands issued by the collision resolution logic comprise a control field contained in the end-of-frame delimiter of the jam packets. Thus, a first port in the set of colliding ports receives a clear-to-send command, and the attached end station begins transmitting its packet after the end of the jam packet. The other ports in the set of colliding ports receive a backoff (or wait) command. After the first packet transmits, or after a slot time expires without activity, the repeater collision resolution logic will issue a clear-to-send command to a next port in the set of colliding ports. The clear-to-send command is carried by the packet from the first port in the set if it is successfully transmitted. Alternatively, the command is sent by a special command packet. The repeater unit ensures fairness by a priority scheme allowing each member of the set of colliding ports an opportunity to transmit one packet before allowing any other ports in the network such opportunity.

The half duplex system can be improved with a frame buffer in the repeater. When use of a frame buffer is implemented, the repeater unit is able to initiate transmission of the first packet of the collision resolution cycle out of its frame buffer, rather than requiring the network to wait until the MAC unit which originated the packet is able to resend that unit to the repeater.

In the fill duplex embodiment, the repeater unit includes logic to transmit a packet received on a first port in the set of colliding ports to the plurality of ports during detection of a collision. The commands issued by the collision resolution logic comprise a control field in the packet transmitted from the first port. The full duplex embodiment can be further enhanced with a frame buffer, which allows continual full duplex operation, allowing all ports in the set of colliding ports to transmit their packet, while receiving a packet from another member of the set of colliding ports.

According to one preferred embodiment of the present invention, the repeater unit includes logic which periodically after expiration of a slot time from the last time the clear-to-send command was sent, sends clear-to-send commands to all ports in the plurality of ports when the network is quiet. Also, after resolution of a set of colliding ports, the clear-to-send polling is resumed.

Thus, the present invention provides a repeater which polls periodically such as once per slot time, while it is idling by sending a clear-to-send command to all ports. The connected MAC units respond with a packet if the MAC unit has a packet ready to send before it receives that clear-to-send message. If the MAC unit has a packet ready to send only after it receives the clear-to-send message, it waits until it receives a next clear-to-send. This way, the delay from the time the repeater starts polling to the time that the latest carrier from a connect MAC unit arrives at the repeater is limited to one slot time, which is based on the worst case round trip delay between the repeater and all of the MAC units.

Collision resolution is handled by the repeater unit by deciding which port first receives a packet. The whole packet received by that port is forwarded to all ports excluding the port itself. After the first port is decided, if there are new activities, the repeater in the half duplex mode jams to all outputs until all ports are quiet. The jam packet is then terminated with a clear-to-send end of frame delimiter for the first port and a backoff command for all other ports allowing the first port a retry opportunity. All ports which receive the backoff at the end of the packet wait until further notice. If no collision is detected while the repeater is forwarding a packet from the first port, the repeater terminates the frame to all ports except the first port which sent the packet with the clear-to-send message, and sends a single clear-to-send delimiter out the first port to indicate that all ports are free to send after the interframe gap.

Collisions are indicated by jamming all ports in the half duplex mode, and terminating the jamming packet with different end of frame delimiters to indicate which MAC can retry right away, and which others must wait until they receive clear-to-send message from the repeater. Because the repeater centrally controls the backoff and retry of each connected MAC unit, no random backoff mechanism is utilized by the MAC units. The repeater unit ensures that all ports involved in a collision have the opportunity to forward a packet without being blocked. Furthermore, the slot time and interframe gap are negotiated by the repeater. This allows optimum delay parameters to be utilized in the network, depending on the particular installation.

Accordingly, the present invention provides a repeater unit which can be scaled with increasing processing speed, data rate and cable delay without changes to the state diagram. Furthermore, the system allows for better bandwidth utilization with improved collision resolution and use of scheduled backoff techniques. Further, negotiated slot time and interframe gap allow for optimization of each installation and greater resource utilization.

The repeater managed collision resolution allows for separation of the minimum frame size parameter from the slot time parameter. Because the collision can be detected at the repeater after a MAC unit finishes transmitting, much smaller minimum frame size can be implemented. Furthermore, collisions are limited to one collision per packet per MAC unit under normal operating conditions. After the one collision, the repeater unit takes over and schedules proper retransmission times. Thus, MAC units can be optimized to reduce retry limits smaller values and no late collisions occur.

Other aspects and advantages of the present invention can be seen upon review of the figures, the detailed description and the claims which follow.

DETAILED DESCRIPTION

Figure 1:
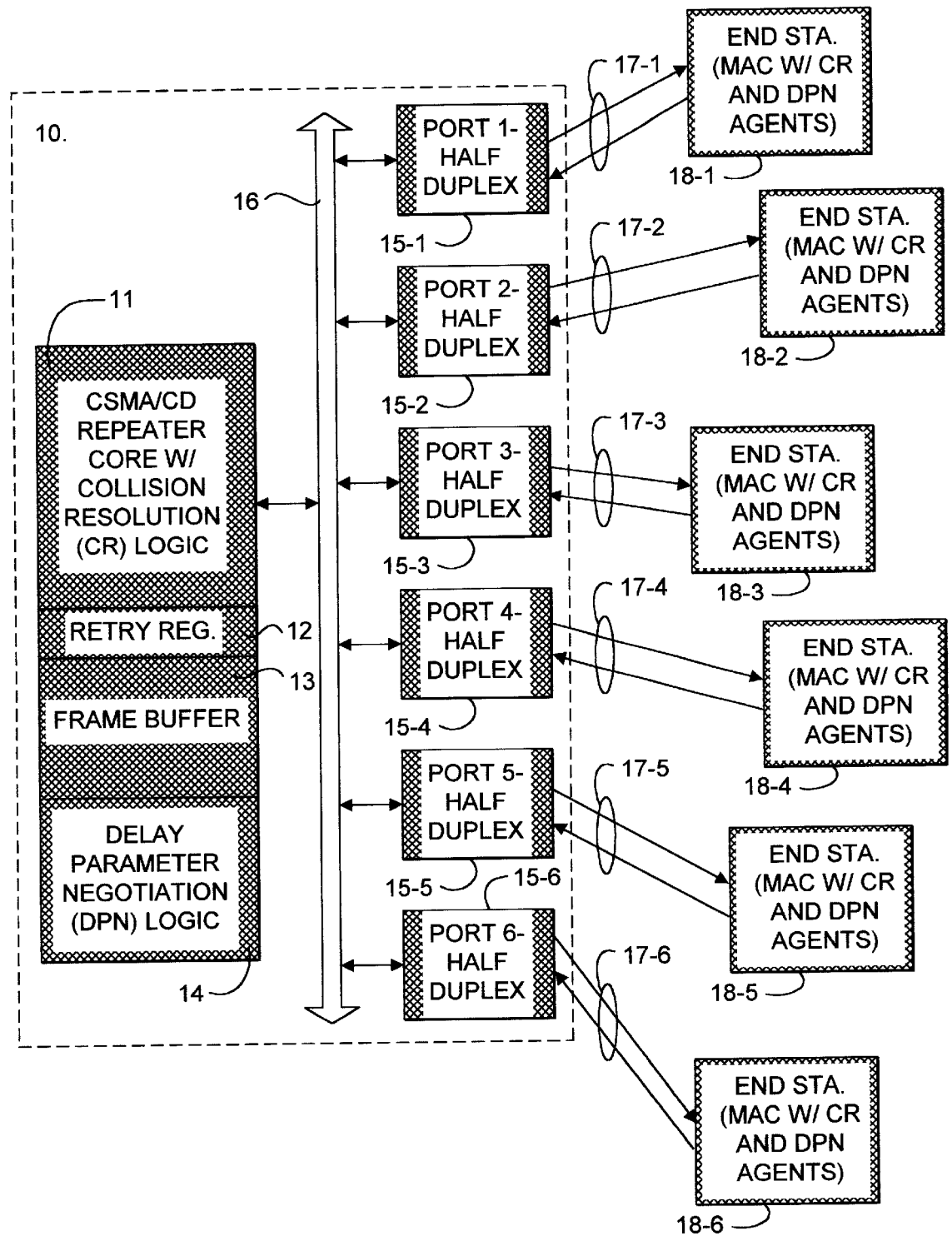
FIG. 1 is a block diagram of a network including a repeater unit according to the present invention using half duplex communication links.

A detailed description of preferred embodiments of the present invention is provided with respect to FIGS. 1–15. FIG. 1 provides a block diagram of a repeater unit 10 and a plurality of end stations coupled to the repeater unit 10. The repeater unit includes a repeater core state machine 11 with collision resolution logic according to the present invention, a retry register 12, optionally a frame buffer 13, and delay parameter negotiation logic 14. A plurality of ports, 15-1 through 15-6, is coupled to the repeater core 11 through a high speed bus 16. Each of the ports 15-1 through 15-6 includes a port state machine (not shown). In the embodiment of FIG. 1, each of the ports is coupled to a half duplex communication link, 17-1 through 17-6, respectively. The communication links 17-1 through 17-6 are coupled to respective end stations 18-1 through 18-6. Each of the end stations includes a MAC unit with a collision resolution agent and a delay parameter negotiation agent according to the present invention.

An operation, the repeater core 11 communicates with the plurality of ports across the bus 16. As part of the communication, the repeater core issues commands to the plurality of ports to manage the receiving, transmitting and collision resolution for packets in the network. Also, the plurality of ports each post status to the repeater core, indicating activity at the port. The retry register 12 is used during collision resolution to store identifiers of a set of ports involved in the collision. The delay parameter negotiation logic is utilized when each new link is added to the network, to negotiate delay parameters, including a slot time and an interframe gap time for use by the network. The frame buffer 13 is an optional memory which can be used for storing packets which have been received from a port involved in the collision. The frame buffer 13 is at least as large as the maximum frame size plus the interframe gap in bit numbers (typically about 1500 bytes long). Buffered packets can be transmitted after all end stations in the network have been notified of the collision, rather than requiring the originating end station to resend the packet to the repeater before retransmitting.

The repeater unit according to a preferred embodiment performs a variety of functions, such as those set forth in IEEE Standard 802.3u-1995 clause 27 "Repeater for 100 Mb/s Baseband Networks", pgs. 203–233 (1995 IEEE). However, the state diagrams of the standard are modified according to the present invention to exercise the repeater based collision resolution and delay parameter negotiation of the present invention.

The communication links 17-1 through 17-6 are preferably implemented using one of the communication media commonly in use in computer networks, such as fiber optic cable, twisted pair cable, coaxial cable or the like. Also, wireless links can be used. The present invention applies to any underlying physical communication medium capable of supporting the CSMA/CD network protocol as modified by the present invention. Key changes in the repeater unit 10 over that specified in the IEEE 802.3u standard include repeater polling, collision resolution and collision indication managed by the repeater core 11. The repeater polls periodically while it is idling by sending a clear-to-send CTS message to all ports. Connected end stations respond to a CTS with a packet, provided that the MAC unit has a packet ready to send before it receives the CTS. If the packet is not ready until after receipt of the CTS, the end station must wait until the next CTS is received. This way, the delay from the time the repeater starts polling to the time the latest packet arrives at the repeater in response to the CTS is limited to one slot time.

If a collision occurs, the repeater core first decides which port is the first port to receive a packet. If no collision occurs, the whole packet is forwarded to all ports excluding the port which received the packet. However, if a collision is detected, the repeater jams all outputs in the half duplex embodiment, until all ports are quiet. Then, the output of the jam packet is terminated with a CTS for the first port, and a backoff message EFB (end of frame-backoff) for all other ports. All ports that get the EFB at the end of the jam packet backoff until further notice. The repeater core cycles through all ports in the set of colliding ports in order to provide each with an opportunity to transmit a packet before other ports may transmit. If no collision is detected while the repeater is forwarding the packet from the first port, the repeater terminates that frame to all ports except the originating port with a CTS, and sends a single CTS to the originating port. This allows all ports in the network the opportunity to send a packet.

The repeater indicates collisions and schedules retries to the MAC units by jamming all the ports and terminating the jamming packet with different end of frame delimiters which indicate which MAC unit can retry next, and which ports must backoff. Because the repeater centrally controls the backoff and retry of each connected MAC unit, the random backoff mechanism of prior art CSMA/CD protocols is not utilized. Rather, end stations retry only when they receive the CTS message at the end of a received packet, or as a special command. The jam packet is generated to maintain the jamming function until all ports are quiet after the collision is detected. This makes sure that the end of frame delimiter is not garbled, and that the command carried by the end of frame delimiter is received by its destination.

Furthermore, the delay parameter negotiation logic 14 of the repeater allows the network to optimize the interframe gap and slot time for a particular installation. Thus, the system does not rely on a fixed number for the interframe gap. Rather, the repeater and all MAC units in end stations coupled to the repeater negotiate during establishment of respective links to establish a worst case interframe gap. The loss of bandwidth caused by an interframe gap is tightly controlled. Furthermore, the slot time utilized for collision resolution according to the present invention is much shorter than the slot time in standard prior art CSMA/CD networks. Rather than end station to end station as in the prior art, the slot time of the present invention is determined to be the maximum round trip cable delay from the repeater to an end station, the two times maximum media independent interface MII to MDI delay through a MAC unit in an end station, plus the maximum MDI to MDI delay through the repeater. This slot time is much shorter than required in prior art CSMA/CD systems.

Operation of the protocol of the present invention for a half duplex network without a frame buffer can be understood with reference to the time and space diagram of FIGS. 2A–2D.

Figure 2A:
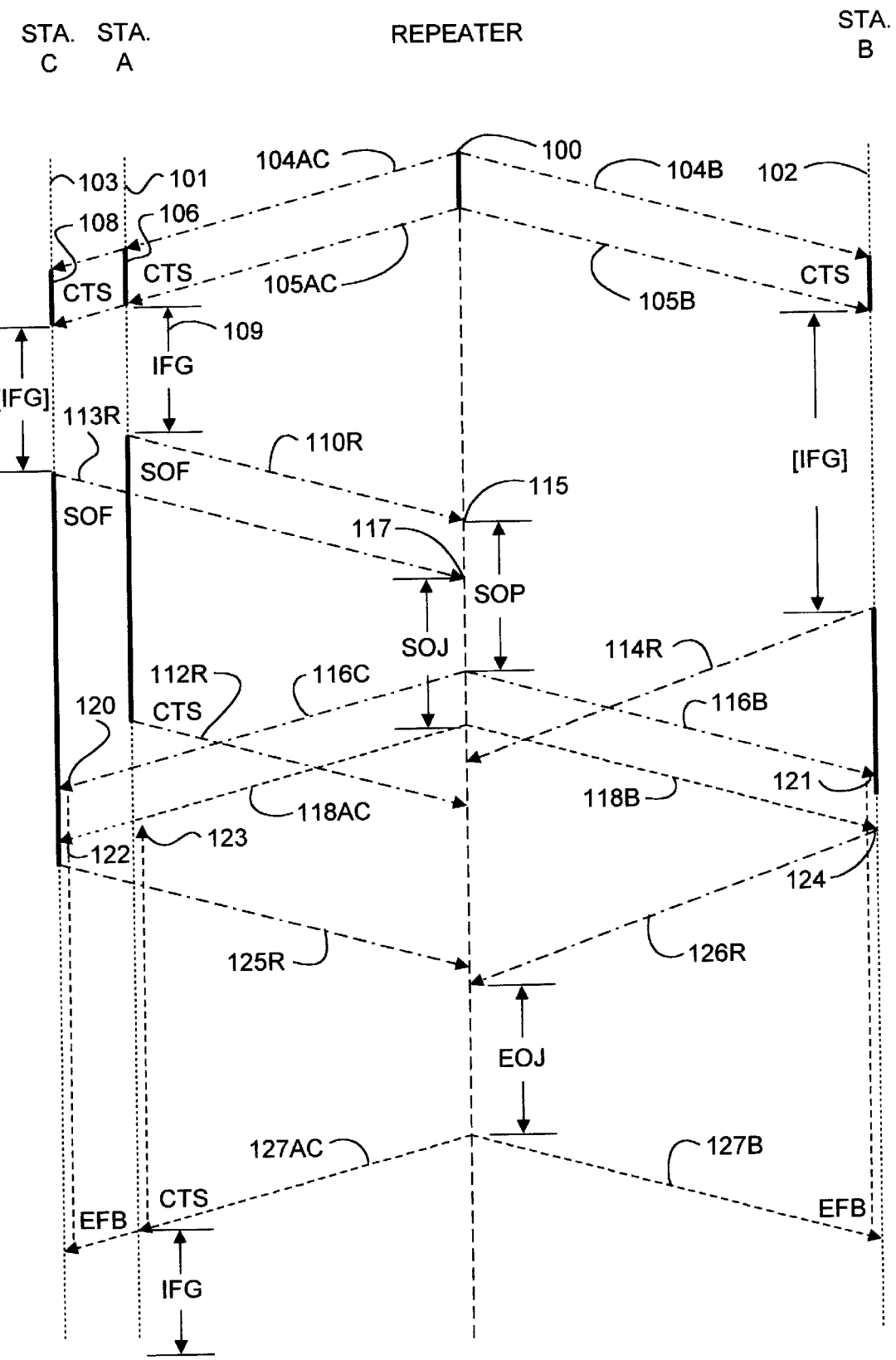
FIGS. 2A–2D are a "time and space" diagram illustrating the improved collision resolution protocol according to the present invention or a half duplex repeater unit.

In FIGS. 2A–2D, the position of the repeater is represented by the vertical line 100 along the center of the drawing. The position of a first station, station A, is represented by line 101. The position of a second station, station B, is represented by line 102. The position of a third station, station C, is represented by line 103. Because the present invention is based on repeater polling, a packet transmission sequence begins with the repeater transmitting to all stations a CTS command packet. The beginning of transmission of the CTS is represented by arrow 104AC and 104B (the letter postscript indicating the destination (stations A, B or C or the repeater R) of the packet). The CTS command packet continues in time until the end of the packet represented by arrow 105AC and arrow 105B. The CTS message is received by station A as represented by vertical bar 106, received by station B as represented by vertical bar 107, and received by station C as represented by vertical bar 108. Station A is the first to receive the CTS message. Therefore after an interframe gap IFG 109, station A begins transmitting a packet which it has ready to send prior to receipt of the CTS message. The beginning of transmission of the packet from station A is represented by arrow 110R (the postscript R corresponding to the repeater being the destination). Station A continues to transmit the packet as represented by bar 111 until the end of the packet, represented by arrow 112R. Station C is the second to receive the CTS command, and after an interframe gap begins transmitting to the repeater as represented by arrow 113R. The timing in FIG. 2A is offset in order to emphasize the spacing of the packets. However, the time between receiving the CTS command and the transmitting of the packet will correspond normally to an interframe gap for all stations, because of the requirement that the receiving station have a packet ready to send prior to receiving the CTS in order to participate in a given transmit interval. In a similar manner station B begins to transmit a packet which it has ready to send represented by arrow 114R.

The repeater receives the packet from station A at point 115 and after a start of packet SOP delay begins retransmitting the packet to all stations except station A, as represented by arrows 116B and 116C. In a similar way, the repeater detects a collision between the packet from station A and the packet from station C at point 117. After a start of jam SOJ delay, the repeater begins transmitting a jam packet to all stations as represented by arrows 118AC and 118B. Both stations C and B will detect a collision with the packet from station A being repeated on arrow 116C and 116B from the repeater. Thus, at point 120 station C begins to sense a collision. At point 121, station B begins to sense a collision. Also, shortly thereafter, the jam packet from the repeater begins to be received by all stations. Thus, station B receives the jam packet at point 122, station A receives the jam packet at point 123 and station B receives the jam packet at point 124. After reacting to the collision, or after transmission of the respective packets is complete, station C and station B cease transmitting as represented by arrow 125R from station C to the repeater and arrow 126R from station B to the repeater. The repeater will sense that all ports are quiet and after an end of jam EOJ delay will cease transmitting the jam packet as represented by arrows 127AC and 127B. According to the present invention, an end of frame delimiter is applied to the jam packet which carries a command to the stations involved in the collision. Because station A was the first station detected by the repeater, it receives a CTS command. Stations C and B both received an end of frame backoff EFB command.

Figure 2B:
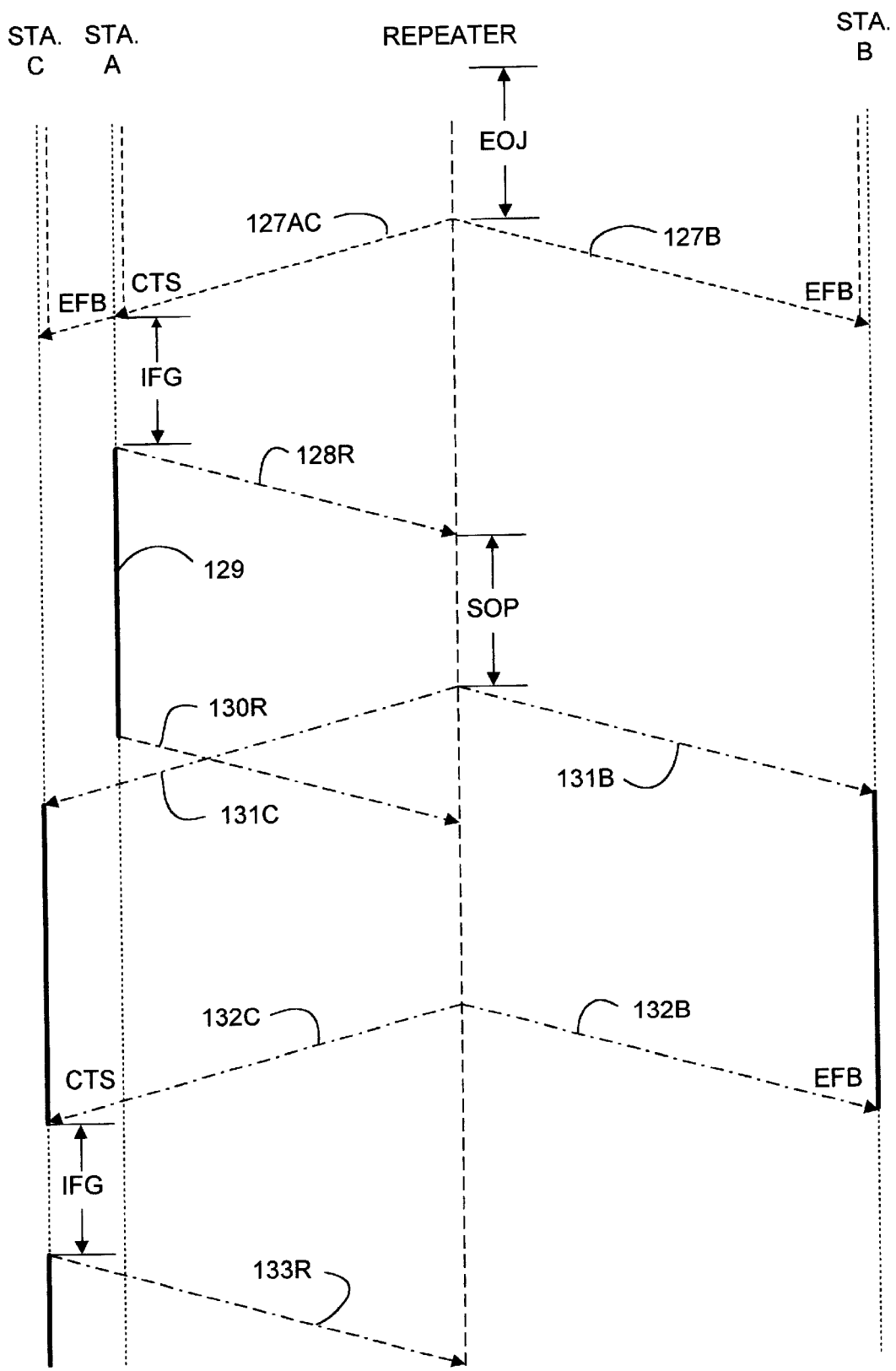

Upon receipt of the CTS command, station A waits the interframe gap IFG and begins transmitting its packet as represented by arrow 128R on FIG. 2B. Station A continues to transmit as represented by vertical bar 129 until the end of the packet as represented by arrow 130R. The repeater receives the packet from station A and after a start of packet SOP delay, repeats the packet to stations C and B as represented by arrows 131C and 131B.

According to a priority rule implemented in the repeater, one of stations C and B will receive a CTS end of frame delimiter, and the other will receive an EFB end of frame delimiter. In FIG. 2B, station C receives the CTS command while station B receives the EFB command, carried with the packet being repeated by the repeater. Thus, after the packet from station A has been transmitted as represented by arrows 132C and 132B, station C waits the interframe gap IFG delay, and begins transmitting its packet as indicated by arrow 133R.

Figure 2C:
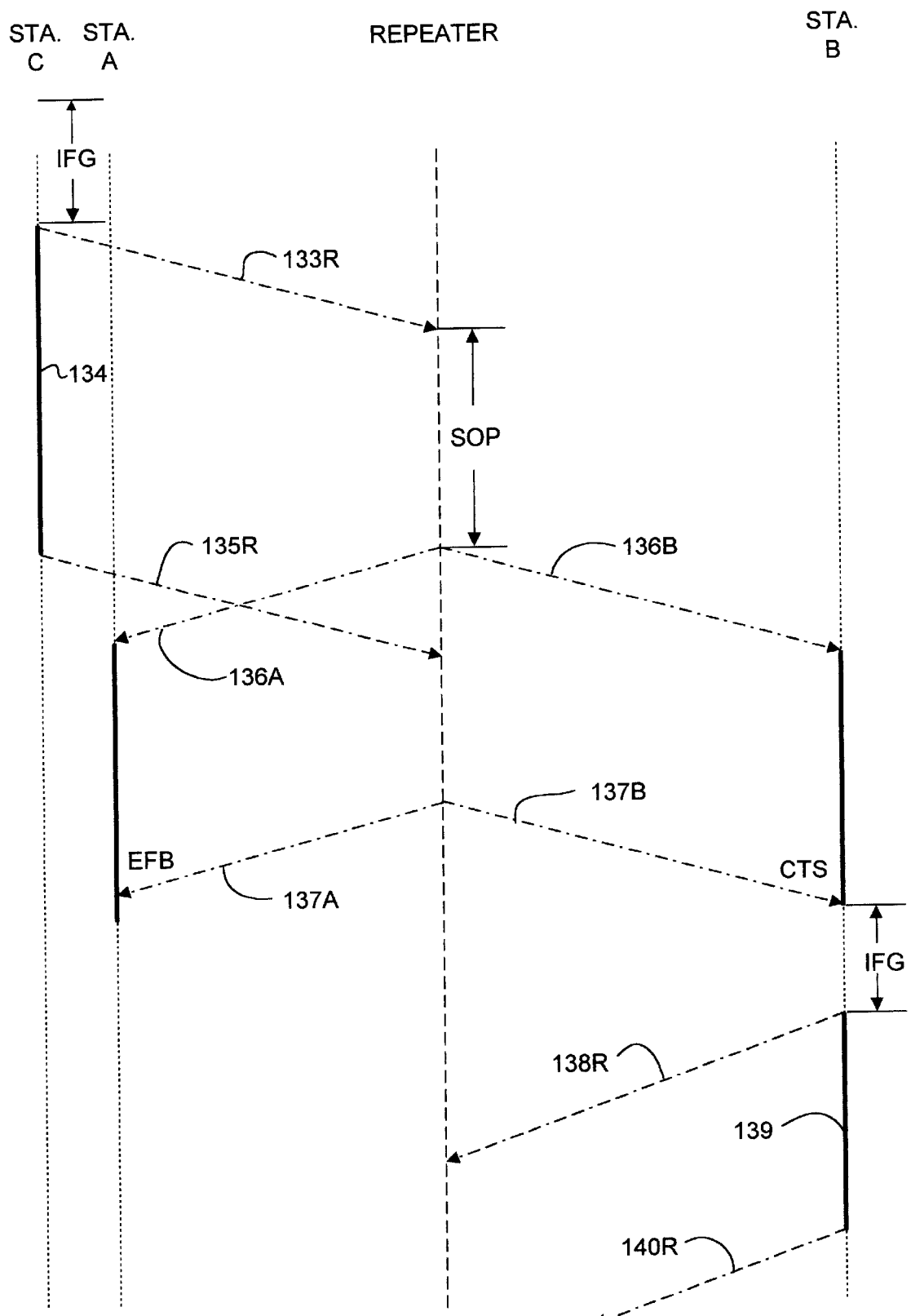
Figure 2D:
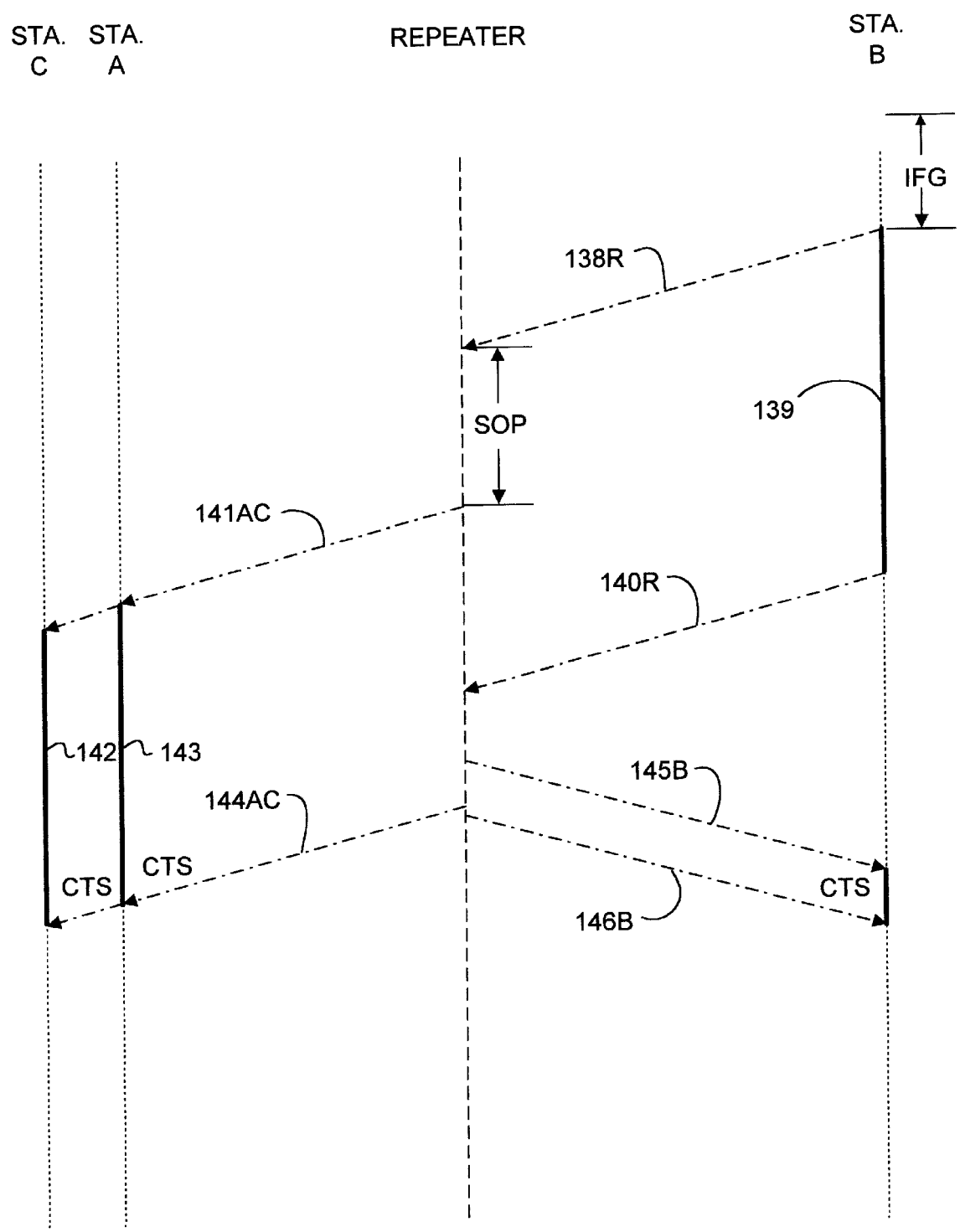

As can be seen in FIG. 2C, station C continues to transmit its packet during the interval 134 until the end of the packet as represented by arrow 135R. The repeater after a start of packet SOP delay, begins repeating the packet to stations A and B as represented by arrows 136A and 136C. At the end of the packet being repeated from station C, as represented by arrows 137A and 137C, station B receives a CTS command and station A receives the EFB command. After the interframe gap IFG delay, station B begins transmitting its packet as represented by arrow 138R. Station B continues to transmit its packet during interval 139 until the end of the packet as represented by arrow 140R. As can be seen in FIG. 2D the repeater receives the packet from station B and after a start of packet SOP delay, begins transmitting the packet as represented by arrow 141AC to stations A and C. Stations A and C receive the packet during intervals 142 and 143. At the end of the packet as represented by arrow 144AC, both stations A and C receive the CTS message, and a command packet is sent as represented by arrows 145B and 146B to station B, providing a CTS command. As can be seen, the repeater enforces a fairness rule under which all three stations involved in the collision are given an opportunity to transmit the packet before end stations connected to other ports of the repeater are allowed an opportunity to send. After all three of the stations have been given an opportunity to send a packet, then all ports in the network are supplied the CTS message, beginning a new transmit cycle.

Figure 3A:
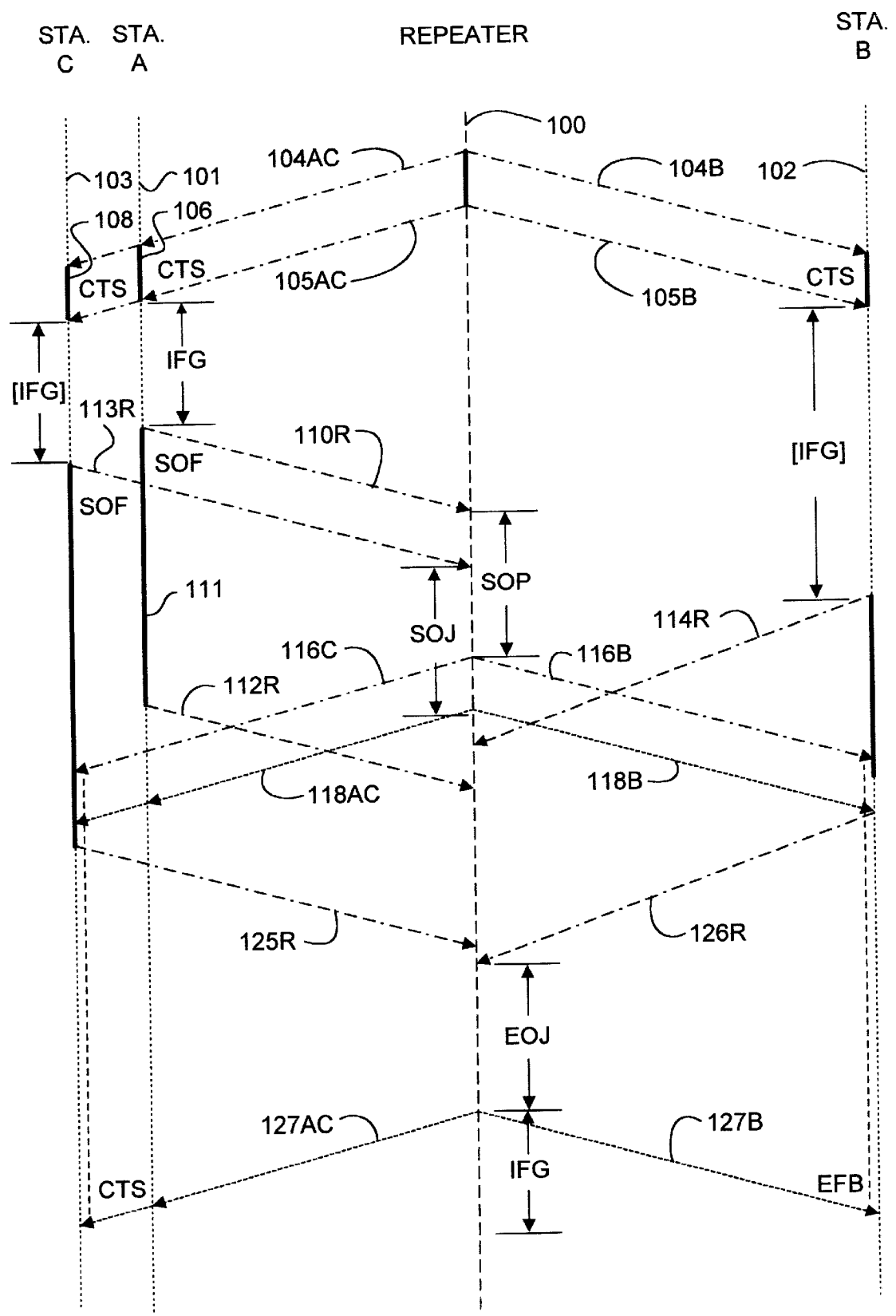
FIGS. 3A & 3B are a "time and space" diagram illustrating the protocol according to the present invention using half duplex communications links with a frame buffer in the repeater unit.
Figure 3B:
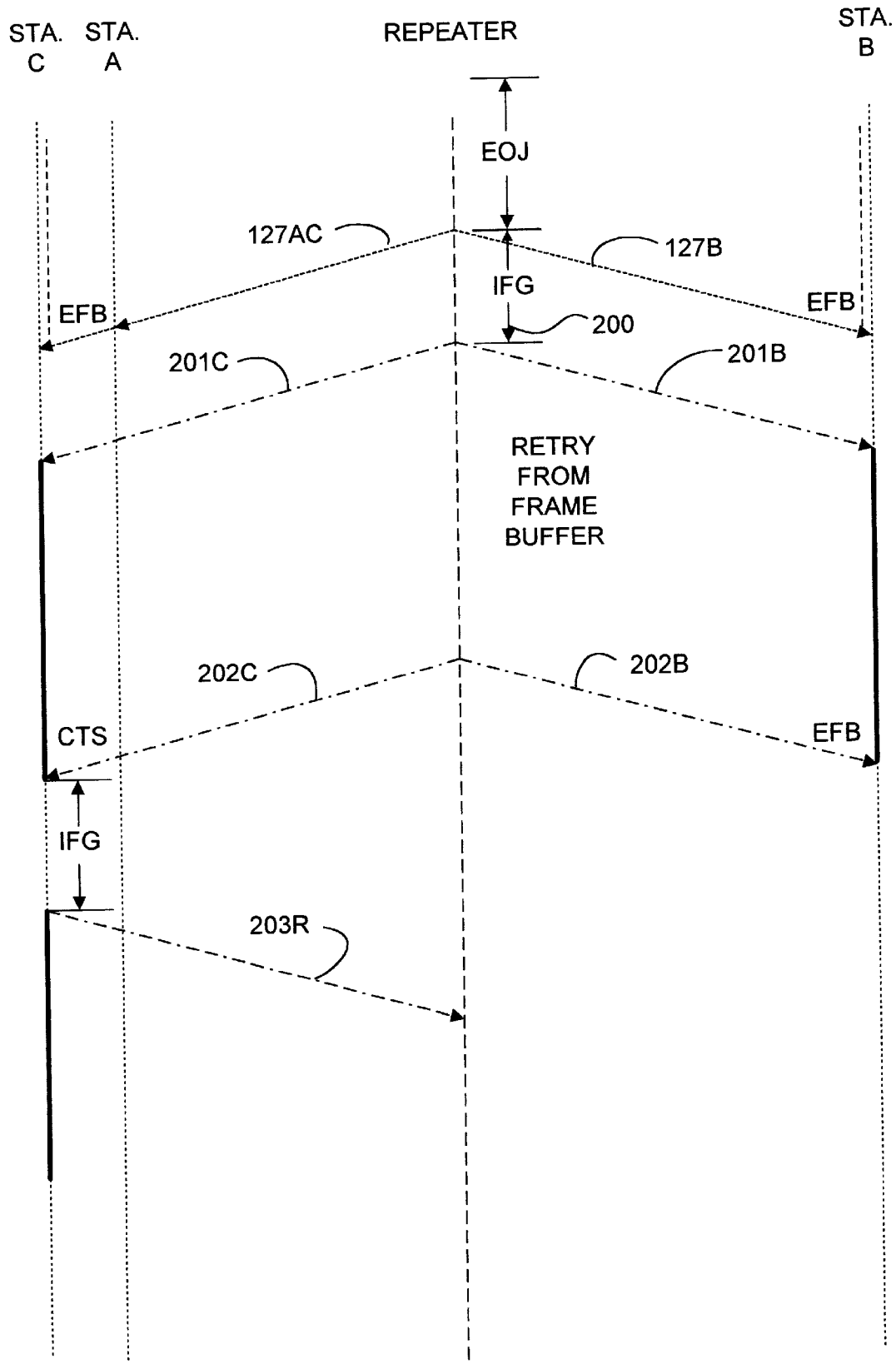

FIGS. 3A and 3B provide a time and space diagram for an embodiment using half duplex communication channels and a frame buffer. The initial collision in this embodiment is the same as that shown in FIG. 2A, and elements of the diagram are given similar numbers. The difference occurs in the operation of the repeater upon receipt of the packet from station A represented by arrows 110R and 112R, transmitted by station A during interval 111. The repeater detects the first packet received and begins buffering that packet immediately. Upon detection of a collision, it continues to buffer the packet while sending out the jam packet. Carriers detected after the port to be buffered is decided are blocked, and not forwarded. After the end of jam EOJ delay interval, the jam packet is terminated as represented by arrows 127AC and 127B. The repeater waits the interframe gap IFG (200), and retries the transmission of the packet from station A out of the frame buffer in the repeater. As can be seen in FIG. 3B, the repeater waits the interframe gap and begins transmission of a packet from the frame buffer as represented by arrow 201C and 201B. At the end of the packet, as represented by arrows 202C and 202B, one of stations B and C receives the CTS message command. In this embodiment, station C receives the CTS command. Upon receipt of the CTS command, station C waits the interframe gap IFG delay, begins transmitting its packet as represented by arrow 203R to the repeater. Station C continues to transmit until the end of the packet. The collision is resolved from this point in the same manner as it is resolved in the system of FIGS. 2A–2D, beginning at the transmission of the packet from station C represented by arrow 133R of FIG. 2. Thus, the use of the frame buffer in a half duplex system results in a net savings of time involved in resolving the collision of about one slot time, which can be seen graphically in FIG. 2B between the arrows 127AC and 131C, as compared to the interval in FIG. 3B between arrow 127AC and arrow 201C.

Figure 4:
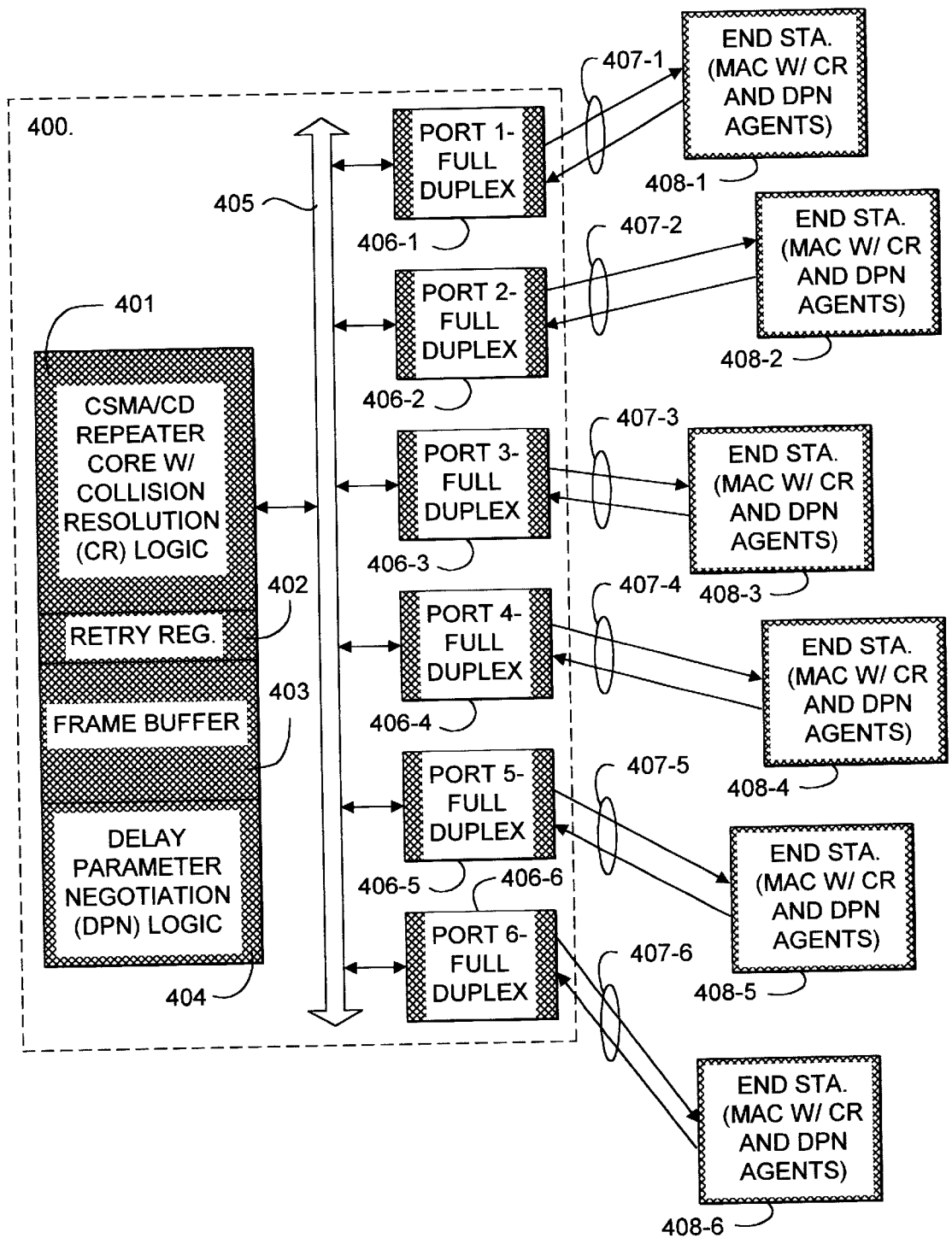
FIG. 4 is a block diagram of a network including a repeater unit according to the present invention with full duplex communication links.

FIG. 4 is a block diagram of a network including a repeater unit 400 according to the present invention, in which the plurality of ports comprise full duplex ports. Thus the repeater unit 400 of FIG. 4 includes a CSMA/CD repeater core state machine with collision resolution logic 401, a retry register 402, (optionally) a frame buffer 403, and delay parameter negotiation logic 404. The core state machine is coupled to a high speed bus 405 which communicates with a plurality of ports 406-1 through 406-6, which include respective port state machines (not shown). Ports 406-1 through 406-6 are coupled to full duplex communication channels 407-1 through 407-6, which in turn are connected to respective end stations 408-1 through 408-6. The end stations 407-1 through 407-6 each include a collision resolution CR agent and a delay parameter negotiation DPN agent. The system of FIG. 4 is similar to that of FIG. 1, except that it supports full duplex operation.

Figure 5:
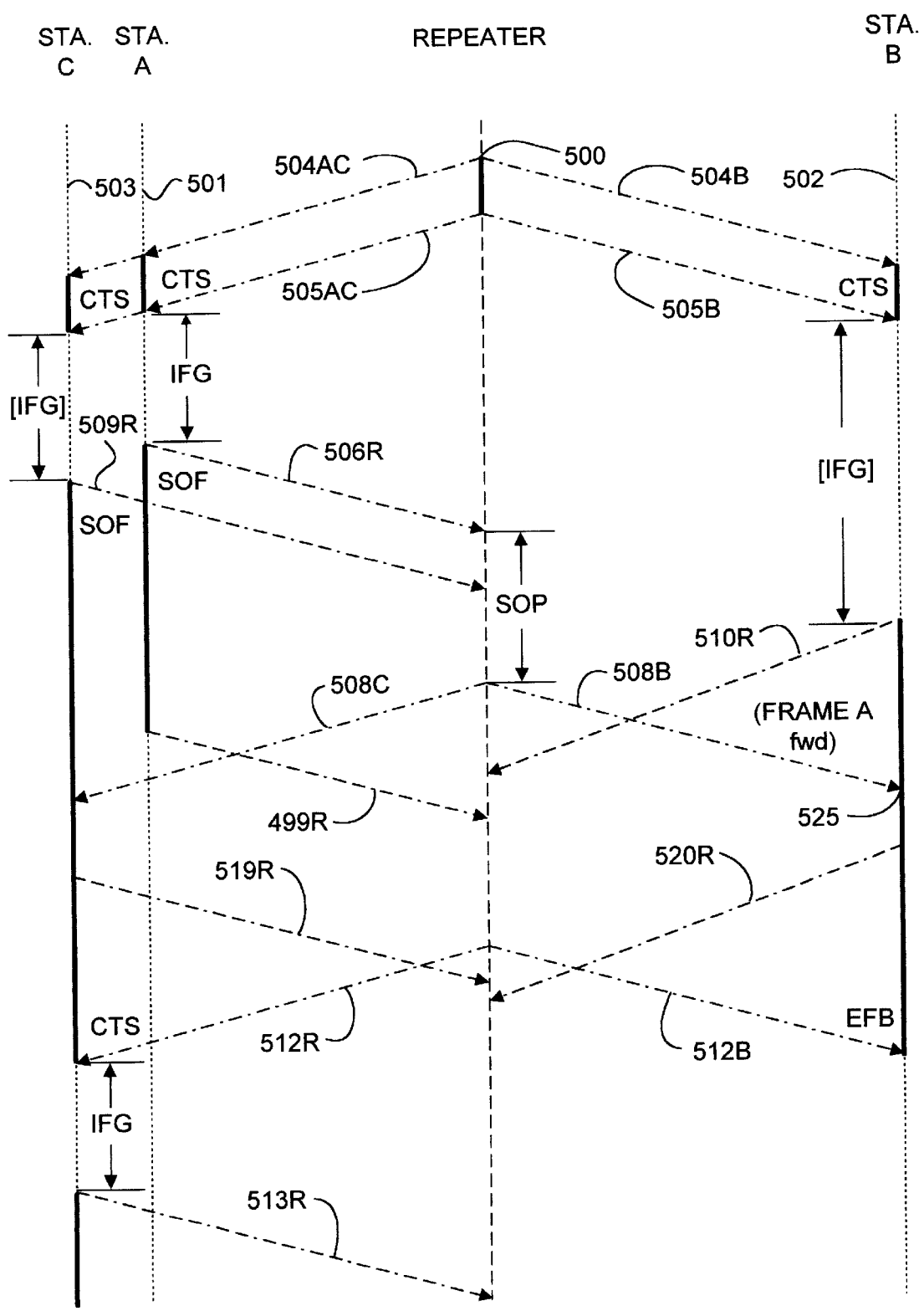
FIG. 5 is a "time and space" diagram illustrating operation of the protocol of the present invention with full duplex communication links.
Figure 6A:
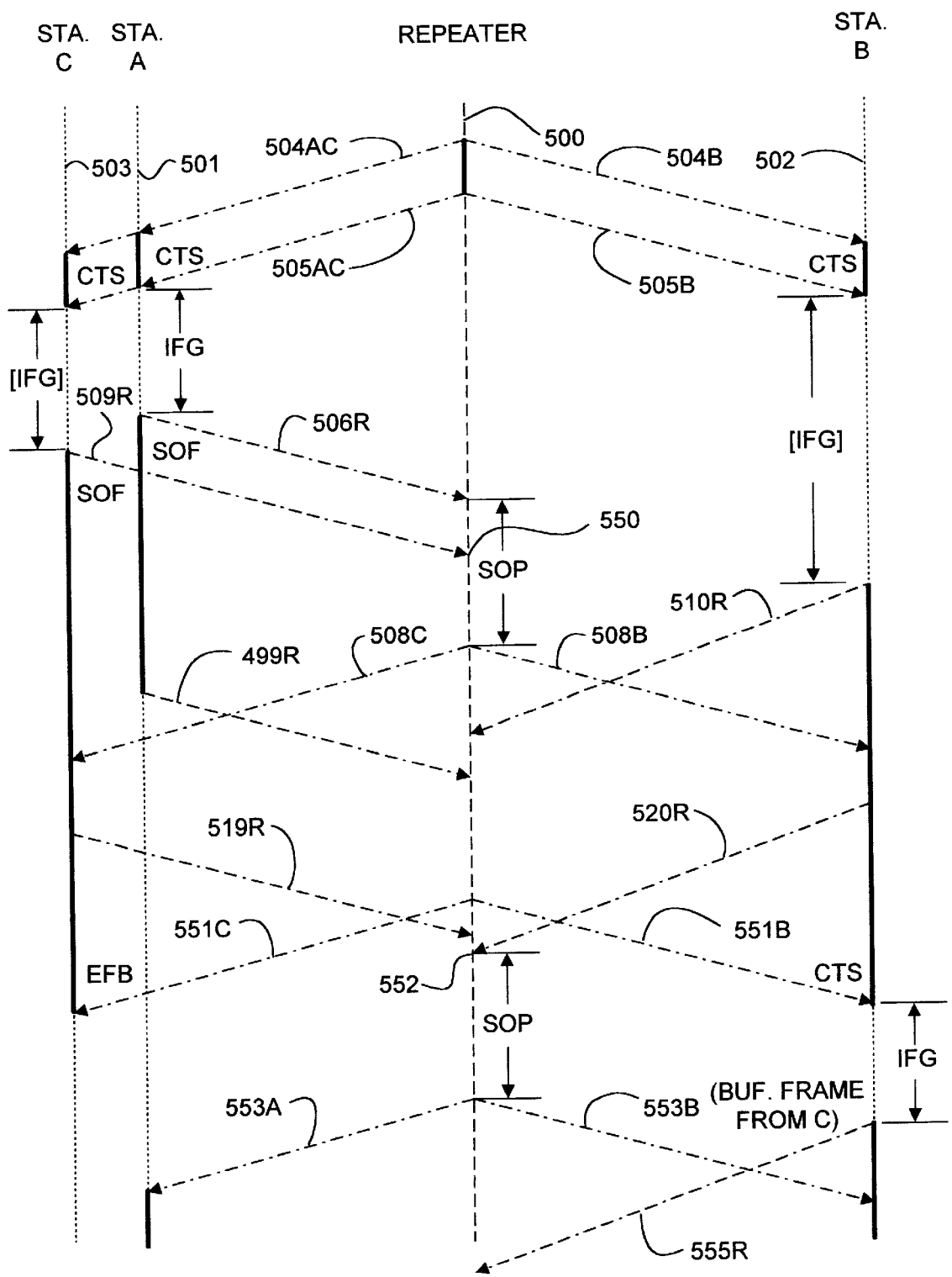
FIGS. 6A & 6B are a "time and space" diagram illustrating operation of the present invention with a full duplex repeater unit with a frame buffer.
Figure 6B:
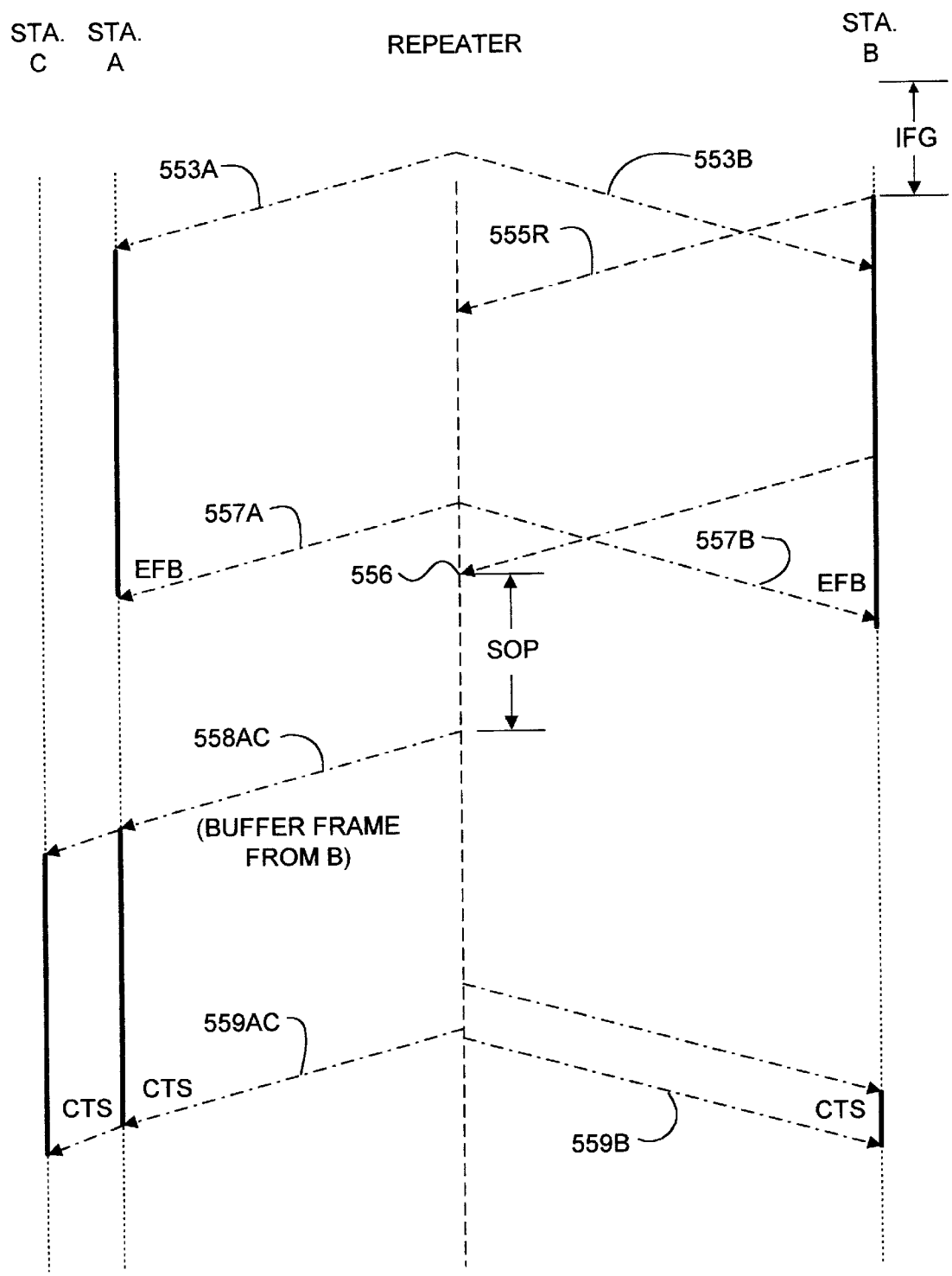

FIGS. 5 and 6A–6B provide time and space diagrams for transmission of packets using the full duplex mode available in the system of FIG. 4, without and with the optional frame buffer respectively.

FIG. 5 illustrates a system which includes a repeater represented by the vertical line 500 near the center of the diagram. Station A is represented by vertical line 501. Station B is represented by vertical line 502. Station C is represented by vertical line 503. The repeater core polls all of the stations with a CTS command simultaneously on all ports, as represented by arrows 504B and 504AC. After the CTS command as represented by arrow 505AC and 505B, all stations which have a packet ready to send prior to receipt of the CTS command begin transmitting. Thus, after an interframe gap IFG, station A, which is the first to receive the CTS command, begins transmitting its packet as represented by arrow 506R. The repeater receives this packet at point 507, and after waiting a start of packet SOP delay, begins transmitting the packet to all stations except station A as represented by arrows 508C and 508B. At the same time, stations C and B respond to the command by beginning to transmit packets. Thus, a packet from station C is transmitted as represented by arrow 509R to the repeater, and a packet from station B is transmitted as represented by arrow 510R to the repeater. Stations C and B will begin detecting a collision with the packet from station A at points 511 and 512 respectively. Because of the full duplex operation, this does not interfere with their receipt of the packet. When the packet being repeated from station A is completed as represented by arrows 512C and 512B, the repeater attaches a command as an end of frame delimiter, providing a CTS command to one of stations B and C, and a EFB command to the other. In the embodiment of FIG. 5, station C receives the CTS command, and after waiting an interframe gap IFG begins transmitting its packet to the repeater as represented by arrow 513R. The sequence continues normally in the same manner as the half duplex embodiment beginning with arrow 133R in FIG. 2C until stations C and B are each given an opportunity to send a packet. Use of full duplex provides a savings of significant amount time over that of the half duplex embodiment. In particular, the repeater will save the difference in amount of time between the length of the packet from station A as represented by the difference of between arrows 508C and 512C in FIG. 5, and the length of the jam packet as represented by arrows 118AC and 127AC in FIG. 2A. Plus, the sequence will save the amount of time between the end of the jam packet at arrow 127AC and the beginning of transmission of the packet at arrow 133R in FIG. 2B from station C.

FIGS. 6A and 6B illustrate operation of the full duplex embodiment with a frame buffer. FIG. 6A, begins in the same manner as that of FIG. 5, and the arrows are given similar reference numbers. However, because the repeater has a frame buffer, when it begins to receive the packet from station C at point 550, it begins filling the buffer with the packet from station C. Thus, at arrows 508C and 508B, it is forwarding the packet from station A while buffering the packet from station C. At the end of transmission of the packet from station A as represented by arrows 551C and 551B, the repeater appends commands instructing station C to backoff (EFB) and station B that it is clear-to-send or retry sending of its packet (CTS). After sending the packet from station A, the repeater waits until all ports are quiet, at point 552, and after a start of packet SOP delay, begins forwarding the packet stored in the buffer from station C as represented by arrows 553A and 553B. Simultaneously, after waiting an interframe IFG gap interval, upon receipt of the CTS command at point 554, station B begins transmitting its packet as represented by arrow 555R. The repeater begins receiving the packet from station B while transmitting the packet from station C out of its buffer. When it begins receiving the packet from station B, it begins buffering the packet of station B until all ports are quiet at point 556. After the end of transmission of the packet from station C, as represented by arrows 557A and 557B both stations A and B are instructed to backoff by the command carried in the end of frame delimiter of the packet from station C as represented by arrows 557A and 557B. The repeater waits a start of packet SOP delay after all ports are quiet at point 556 and forwards the packet from station B out of its buffer to stations A and C as represented by arrow 558AC. The repeater continues to forward the packet until the buffer is empty at arrow 559AC and then sends CTS to all parties to enable competition. If a fourth end station is involved in the collision of FIGS. 6A–6B, then at the time of arrows 551C and 551B, the fourth end station receives a "wait and retry" command in the end of frame delimiter. The fourth end station would then receive CTS at the time of arrows 557A and 557B, along with the packet from station C. The full duplex embodiment with the frame buffer results in a significant savings over the full duplex embodiment without a frame buffer. The savings in time in this embodiment arises because of the ability to buffer packets is not available in the system of FIG. 5. Thus, the repeater is able to forward the packet from station C at the time represented by arrow 553A in FIG. 6A. In FIG. 5, the packet from station C does not begin to be forwarded until at least a slot time later, in the manner illustrated in FIG. 2C beginning at arrow 133R, corresponding to arrow 513R of FIG. 5.

The processes is illustrated above with respect to FIGS. 1 through 6A–6B are implemented using logic in the repeater which can take a variety of formats. The logic can be implemented with computer software, firmware, hardwired logic or any combination of these approaches, depending on the particular implementation.

Figure 7:
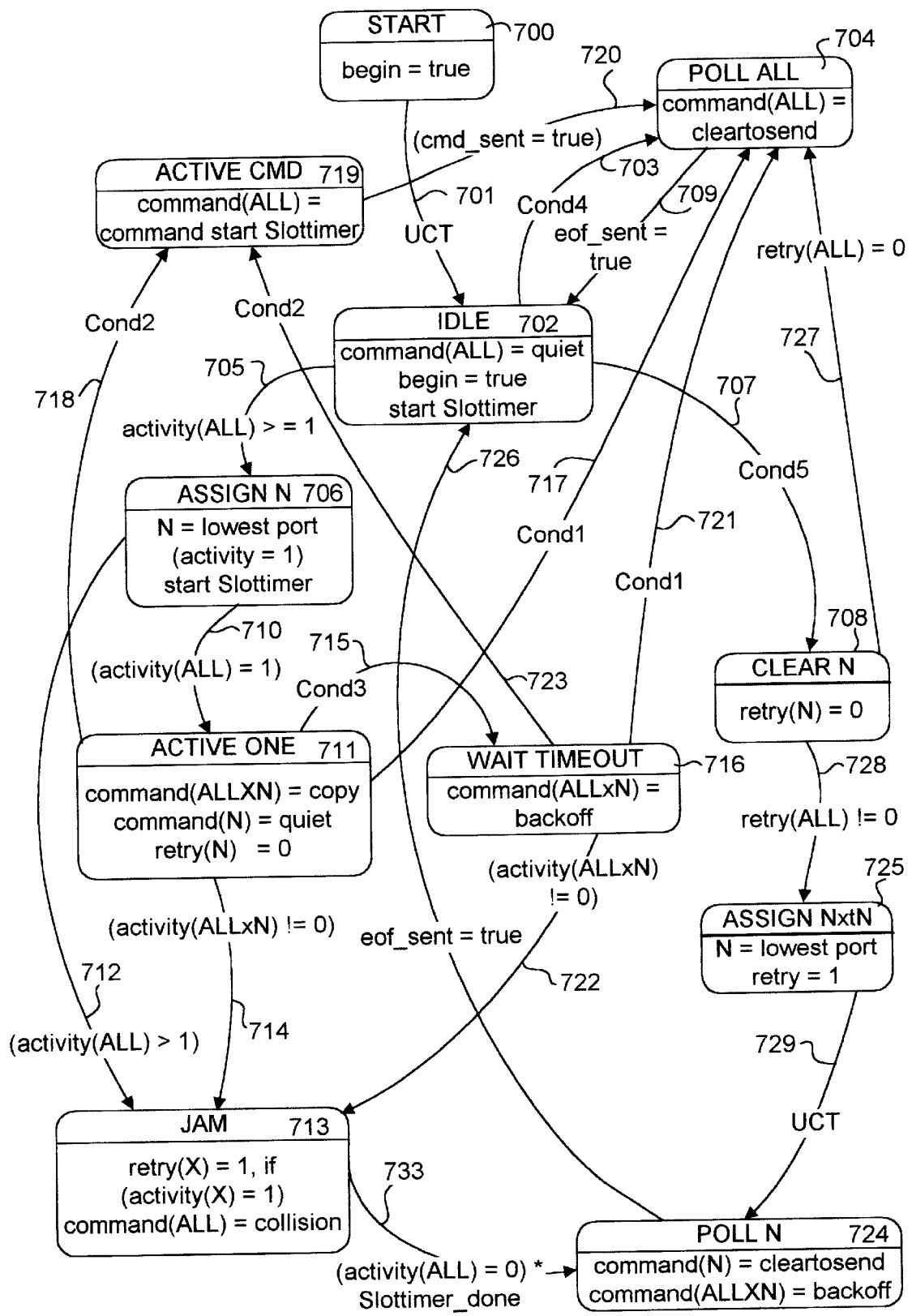
FIG. 7 is a state diagram for a repeater core state machine in the system of FIG. 1.
Figure 8:
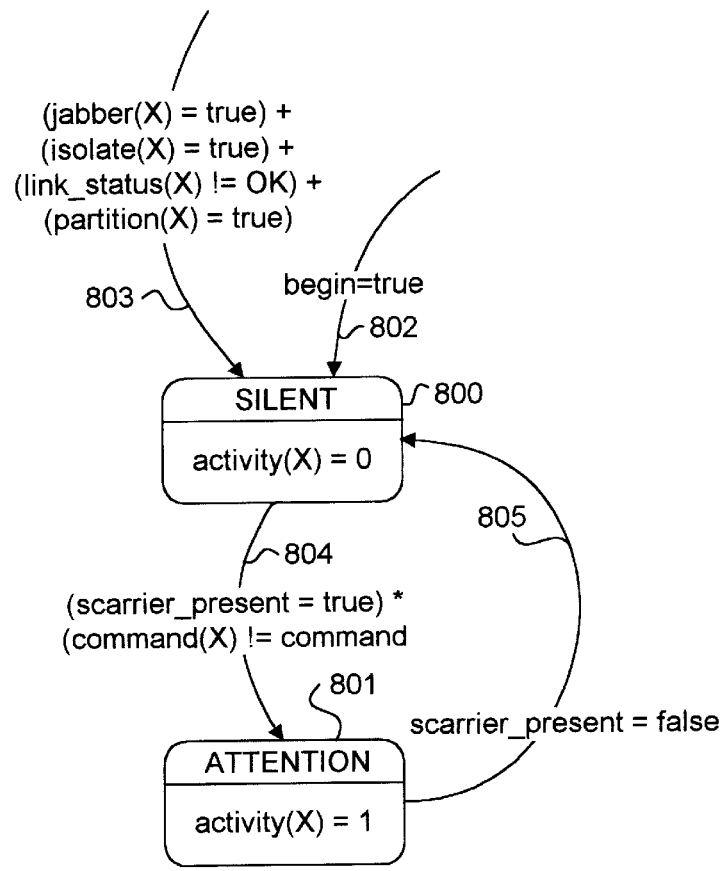
FIG. 8 is a receive state diagram for a port in the plurality of ports on the repeater unit in the system of FIG. 1.
Figure 9:
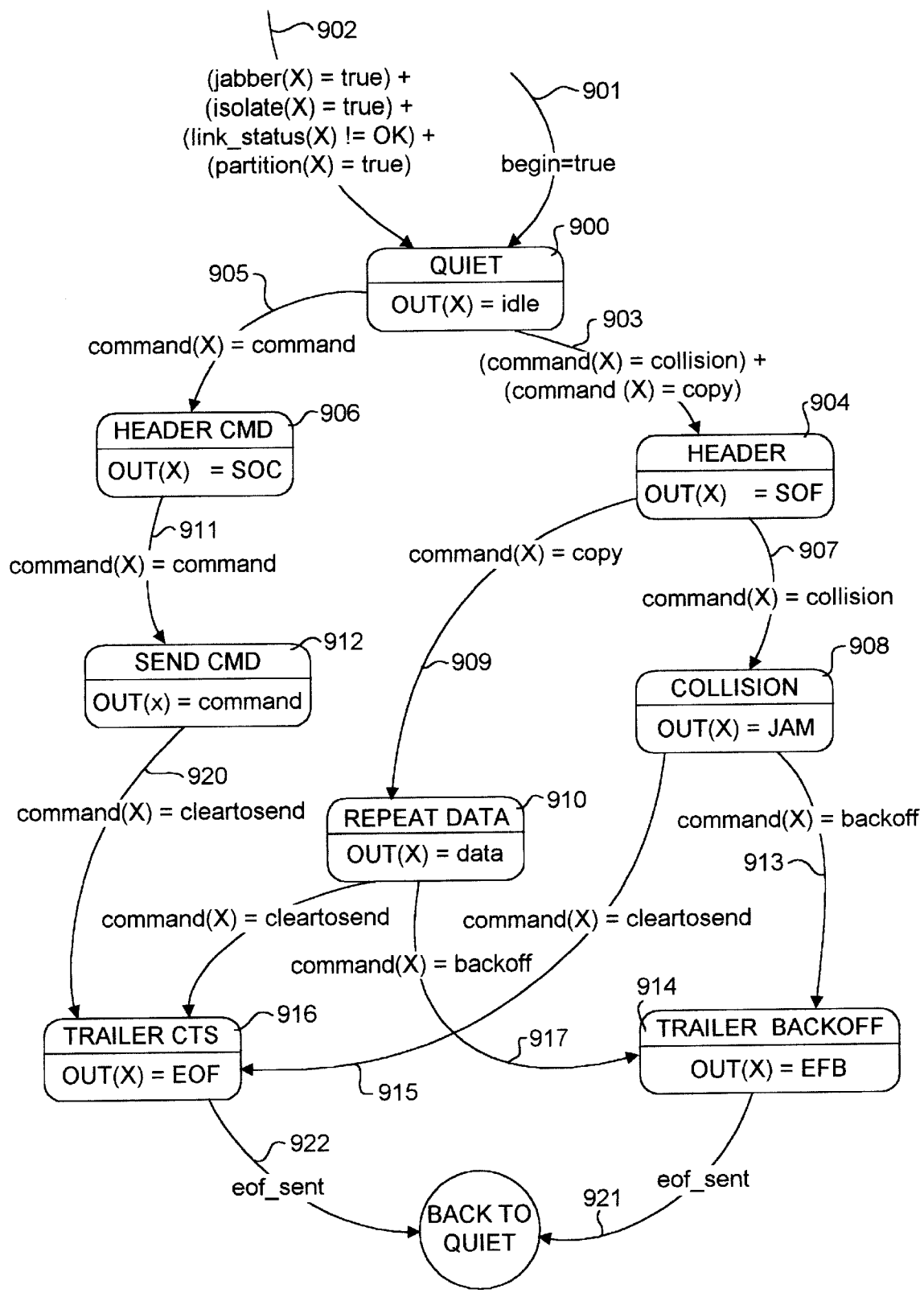
FIG. 9 is a transmit state diagram for a port in the plurality of ports on the repeater unit of FIG. 1.

FIGS. 7, 8 and 9 provide state diagrams for operation of the system of FIG. 1 without a frame buffer, using the state diagram conventions of the IEEE Standard 803.2u.

State diagram of FIG. 7 corresponds to the CSMA/CD repeater core state machine, with corresponding port state machines for each port receive function and each port transmit function set forth in FIGS. 8 and 9, respectively.

In FIG. 7, the description of each state, and the transitions out of the state are set forth below.

In FIG. 7, the parameter Cond1=(activity(ALL)=0)*(all_data_sent=true)*(Slottimer_done)*(retry(ALL)= 0)*(newlink=false). The parameter Cond2=(activity(ALL)=0)*(all_data_sent=true)*(Slottimer_done)*(retry(ALL)=0)*(newlink=true). The parameter Cond3=(activity(ALL)=0)*(all_data_sent=true)*(Slottimer_done)*(retry(ALL)!=0). The parameter Cond4=(activity(ALL)=0)*(Slottimer_done)*(retry(ALL)=0). The parameter Cond5=(activity(ALL)=0)*(Slottimer_done)*(retry(ALL)!=0).

START state 700

The START state 700 is initiated upon turning on the repeater or at reset. In the START state, the begin parameter is set true. There is an unconditional transition on line 701 to the IDLE state 702.

IDLE state 702

In the IDLE state 702, the repeater core issues a quiet command to all ports, sets the begin parameter equal to true, and starts a slot timer. Transitions out of the IDLE state include the transition on arrow 703 to the POLL ALL state 704. The transition on line 703 occurs when the slot timer has expired, no ports have set entries in the retry register (retry(ALL)=0), and there is no activity on any port (activity (ALL)=0).

A transition from the IDLE state 702 occurs on line 705 to the ASSIGN N state 706. This transition occurs when the repeater core detects activity on one or more ports in the repeater (activity(ALL)>=1).

A third transition out of the IDLE state 702 occurs on line 707 to the CLEAR N state 708. The transition on line 707 occurs after the slot timer has expired, and at least one port in a plurality of ports continues to have a set entry in the retry register (retry(ALL)!=0), and no activity is detected on any of the ports (activity(ALL)=0).

POLL ALL state 704

The POLL ALL state 704 causes the repeater core to issue a CTS command to all ports. Thus, on the transition 703 from the IDLE state to the POLL ALL state 704, all ports on the repeater receive the CTS command. The end of frame delimiter is sent which carries the command, then there is a transition out of the POLL ALL state 704 on line 709 to the IDLE state 702. Transitions 703 and 709 result in periodic polling of all of the stations in the network with a CTS command.

ASSIGN N state 706

The ASSIGN N state 706 results in assigning a particular port, port N, as a preferred port for subsequent processing as will be apparent from the following states. In the preferred embodiment, port N is assigned to be the port having the lowest port number, with activity detected in the transition 705 from the IDLE state 702 to the ASSIGN N state 706. Thus, the first port on which a packet is received and causes the transition 705 will be assigned port N in normal systems. If more than one port is active at the same time on this transition, then the port having the lowest port number is assigned as port N. After assigning port N, the slot timer is begun in the ASSIGN N state 706. Transitions out of the ASSIGN N state 706 include the transition on line 710 to the ACTIVE 1 state 711. This transition 710 occurs if the activity in ASSIGN N state 706 is only on one port. If there is activity on more than one port during the ASSIGN N state 706, then a transition occurs on line 712 to the JAM state 713.

ACTIVE ONE state 711

In the ACTIVE ONE state 711, the core state machine issues a copy command to all ports except port N and a quiet command to port N, and sets the retry register entry for port N to zero. This results in repeating the packet being received on port N to all ports except port N. Also, since no collision is detected in this state, then the retry register is not set for any port.

The transitions out of ACTIVE ONE state 711 include a transition on line 714 to the JAM state 713. The transition on line 714 occurs when the activity is detected on any port except for port N. This corresponds to a collision, and hence a transition on line 714 to the JAM state 713.

Another transition occurs out of the ACTIVE ONE state 711 on line 715 to the WAIT TIMEOUT state 716. This transition occurs if the slot timer is not expired, but all data has been sent from port N, while there is no activity on any port, and there is no retry pending for any port.

A transition on line 717 occurs from the ACTIVE ONE state 711 to the POLL ALL state 704 if the slot timer expires before all data of the packet is sent and all data is sent, while there is no activity on any port on the repeater, and no retry is pending for any port, and no new station has been added to the network. Slottimer_done*(all_data_sent=true)*(activity(ALL)=0)*(retry(ALL)=0)*(newlink=false).

A transition on line 718 occurs from the ACTIVE ONE state to the ACTIVE CMD state 719. A transition on line 718 occurs under the same conditions as those for transition on line 717, except when a new link has been added to the network. Slottimer_done*(all_data_sent=true)*(activity(ALL)=0)*(retry(ALL)=0)*(newlink=true).

ACTIVE CMD state 719

In the ACTIVE CMD state 719, the repeater core sends a command to all stations to initiate the delay parameter negotiation process described above. In addition, the slot timer is reset in state 719. Transition out of state 719 occurs on line 720 to the POLL ALL state 704, after a command sent signal is set true, returning the core state machine to the standard polling state.

WAIT TIMEOUT state 716

The WAIT TIMEOUT state 716 causes the core state machine to issue a command to all ports except port N to backoff, pending the expiration of the slot timer. A transition occurs out of WAIT TIMEOUT state 716 on line 721 to the POLL ALL state 704, after expiration of the slot timer, when all of the data in the packet from port N has been transmitted, no activity is detected on any of the ports, and no retries pending for any of the ports, if no new link is added.

Slottimer_done*(all_data_sent=true)*(activity(ALL)=0)* (retry(ALL)=0)*(newlink=false). If a new link is up, then the transition on line 723 occurs to the ACTIVE CMD state 719. Slottimer_done*(all_data_sent=true)*(activity(ALL) =0)*(retry(ALL)=0)*(newlink=true).

If in the WAIT TIMEOUT state 716, a collision occurs, as represented by activity on any port except port N, then a transition occurs on line 722 to the JAM state 713. This transition allows for the condition in which the packet transmitted from port N out of the ACTIVE ONE state 711 is shorter than a slot time, and a collision occurs before the slot time has expired.

JAM state 713

The JAM state 713 is entered across transitions 712, 714 and 722 upon detection of a collision in the repeater. In the JAM state 713 the retry register entry for each port which the core state machine detects having activity during the collision is set to one. Also a collision command is issued to all ports. Transitions out of the JAM state 713 to POLL N state 724, occur on line 733 after the slot timer has expired, and the activity on all ports has ceased.

POLL N state 724

In the POLL N state 724, the repeater core issues a CTS command to port N, that is the port assigned in the ASSIGN N state 706 or the port assigned in the ASSIGN NxtN state 725, in the end of frame delimiter of the JAM packet. Also, the command to all ports except port N are set to backoff EFB.

Transitions out of the POLL N state 724 back to the IDLE state 702 occur on line 726 when the end of frame delimiter has been successfully sent.

CLEAR N state 708

In the CLEAR N state 708, the retry register for port N is reset to zero. A transition occurs on line 727 to the POLL ALL state 704 if the retry register entries for all ports have been reset. If on the other hand, if any ports continue to have a set retry register entry, then a transition occurs on line 728 to the ASSIGN NxtN state 725.

ASSIGN NxtN state 725

In the ASSIGN NxtN state 725, the parameter N is set to the lowest port in the priority scheme which continues to have a retry register entry set to one. After setting the parameter N, then there is an unconditional transition on line 729 to the POLL N state 724. It can be seen that a cycle from state 724, to state 702, to state 708, to state 725 continues until all ports involved in a collision, as indicated by the contents of the retry register, are given an opportunity to transmit a packet.

FIG. 8 illustrates the receive state machine for each port in the repeater of FIG. 1. Receive state machine includes a SILENT state 800 and an ATTENTION state 801. The state machine enters the SILENT state 800 on transition 802 upon start up of the machines, or when begin equals true. Also, the state machine enters the SILENT state 800 on transition 803 if a number of error conditions, such as the standard error conditions in the 802.3u repeater specifications occur.

A transition out of the SILENT state 800 occurs on line 804 to the ATTENTION state 801, when the port detects a carrier, if the command for that port is not equal to the command used for initiating the delay parameter negotiation sequence.

The ATTENTION state 801 results in setting of the activity parameter for port X equal to one. A transition out of the ATTENTION state 801 occurs on line 805, when the carrier is no longer sensed on the port.

FIG. 9 illustrates the port transmit state diagram for use with the core state machine of FIG. 7.

OUIET state 900

The transmit state diagram includes QUIET state 900 which is entered at startup, as indicated by the transition on line 901, and during certain error conditions in the repeater as indicated on line 902, which correspond to standard error conditions for the 802.3u repeater.

In the QUIET state 900, the output of the repeater port is idle. A transition occurs out of the QUIET state 900 on line 903 to the HEADER state 904. Also a transition occurs out of the QUIET state 900 on line 905 to the HEADER CMD state 906. The transition on line 903 occurs if the command to port X is equal to collision, or if the command for port X is equal to copy. The transition on line 905 occurs if the command for port X is equal to the "command", corresponding to the delay parameter negotiation sequence.

HEADER state 904

The HEADER state 904 results in transmitting out of the port X, the start of frame delimiter. A transition occurs from the HEADER state 904 on line 907 to the COLLISION state 908. Also a transition occurs on line 909 out of the HEADER state 904 to the REPEAT DATA state 910. The transition on line 907 occurs if the command for port X is equal to the collision command. The transition occurs on line 909 if the command for port X is equal to the copy command.

HEADER CMD state 906

The HEADER CMD state 906 results in sending the start of frame delimiter for the delay parameter negotiation command. The transition occurs out of the HEADER CMD state 906 on line 911 to the SEND CMD state 912. The transition on line 911 occurs if the command for port X is equal to the command for the delay parameter negotiation sequence.

COLLISION state 908

In the COLLISION state 908, the output for port X is equal to the jam sequence. A transition occurs out of COLLISION state 908 on line 913 to the TRAILER BACK-OFF state 914. Also a transition occurs on line 915 out of the COLLISION state 908 to the TRAILER CTS state 916. The transition on line 913 occurs when the command for port X is equal to the backoff command. The transition on line 915 occurs when the command for port X is equal to the clear-to-send command.

REPEAT DATA state 910

The REPEAT DATA state 910 results in outputting from port X the data of the current packet (data from port N). A transition out of the REPEAT DATA state 910 occurs on line 917 if the command for port X is equal to the backoff command, to the TRAILER BACKOFF state 914. Also a transition occurs on line 918 from the REPEAT DATA state 910 if the command for port X is equal to the clear to send command, to the TRAILER CTS state 916.

SEND CMD state 912

The SEND CMD state 912 results in outputting of the command packet from port X. A transition occurs on line 920 from the SEND CMD state 912 if the command for port X is equal to the clear to send command, to the TRAILER CTS state 916.

TRAILER BACKOFF state 914

In the TRAILER BACKOFF state 914, the output of the port is equal to the end of frame delimiter corresponding to the backoff command. A transition occurs out of the TRAILER BACKOFF state 914 on line 921 after the end of packet is successfully sent, back to the QUIET state 900.

TRAILER CTS state 916

The TRAILER CTS state 916 results in outputting of the end of frame delimiter corresponding to the clear to send command. Transition out of the TRAILER CTS state 916 occurs on line 922 after successful transmission of the end of frame delimiter, back to the QUIET state 900.

Figure 10:
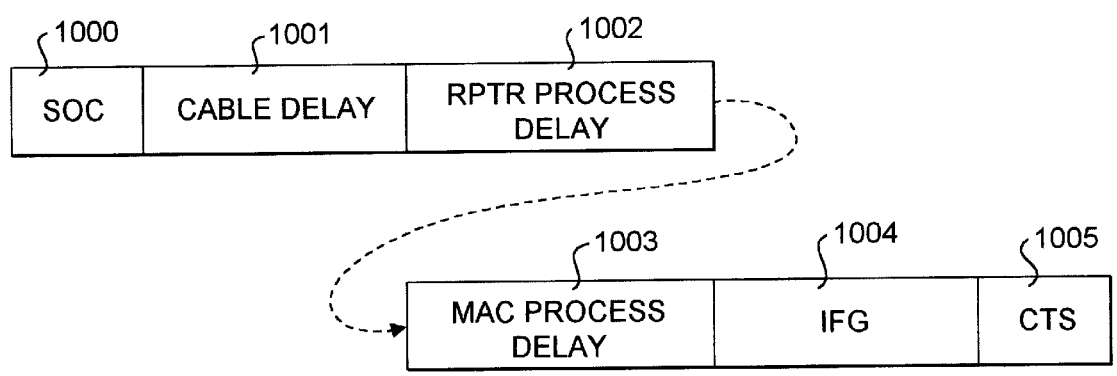
FIG. 10 illustrates a delay parameter negotiation packet used according to the present invention.

FIG. 10 illustrates the format of the command packet issued for the negotiation of delay parameters in response to the "command" command signal from the core state machine. The packet includes the start of frame delimiter 1000 followed by a first field 1001 which carries the worst case cable delay for all end stations coupled to the repeater. The next field 1002 in the command packet includes the worst case repeater processing delay. Packet field 1003 carries the worst case MAC process delay for all end stations coupled to the repeater. The packet field 1004 carries the worst case interframe gap parameter for all end stations coupled to the repeater. Finally, an end of frame delimiter is provided in field 1005, which is clear to send command. The fields 1001–1004 are each four bytes long in a preferred embodiment. This provides significant flexibility in setting the delay parameters during the delay parameter negotiation process.

The repeater starts the negotiation process by sending the command packet of FIG. 10. This carries the cable delay which is equal to the maximum round trip cable delay to all of the end stations already connected, the repeater processing delay which is equal to the maximum processing delay in the repeater from MDI to MDI, the MAC processing delay, which is equal to the maximum MAC processing delay for all MACs connected to the repeater, and the interframe gap parameter which is equal to the maximum allowable receive interframe gap for all of the MAC units that are already connected to the repeater.

The DPN agent in the MAC unit coupled to the new link responds by echoing the cable delay parameter and repeater process delay parameters back to the repeater. The MAC processing delay returned by the MAC unit is equal to the maximum of the local MAC unit's MDI to MDI processing delay, or the value received from the repeater. Also, the interframe gap parameter returned by the MAC unit is equal to the maximum of the interframe gap allowed by the new MAC unit, and that received in the packet from the repeater.

At the repeater, the measured round trip cable delay is determined for the command and response packets. The internal worst case round trip cable delay is updated if necessary in response to the measurement. The input from the new MAC unit processing delay is used to update the worst case MAC processing delay, and the new interframe gap parameter if required. Finally, the slot time is calculated based on the new round trip cable delay, the repeater processing delay and the MAC unit processing delay maximums.

The delay parameter negotiation is done on a port by port basis, during the last step of establishing a new link to the repeater. The negotiation for the new link can be conducted without interrupting normal operation of the repeater. Once the negotiation is done for any new port, the repeater waits until the retry vector for collision resolution is all zero and all activity is quiet, and then broadcasts the newly negotiated values to all of the MAC units. The repeater sends the control packet with a SOC start of packet delimiter indicating such control packet.

FIGS. 7, 8 and 9 illustrate the state diagram for a repeater with half duplex ports, and without a frame buffer. FIGS. 11A–11C and 12 illustrate the state diagram for configurations described in the present application, including half duplex HD, half duplex with a frame buffer HD*BUF, full duplex FD, and full duplex with a frame buffer FD*BUF. In FIGS. 11A–11C and 12, the parameter Cond1 corresponds to the state in which there is no activity detected on the ports and after all data has been sent of the current packet (activity(ALL)=0)*(all_data_sent=true). The parameter Cond2 corresponds to the state where all entries in the retry register are reset (retry(ALL)=0). The parameter Cond3 corresponds to the expiration of the slot timer (slottimer_done). The parameter Cond4 corresponds to the state in which a new link has been added to the repeater (newlink=true).

Figure 11A:
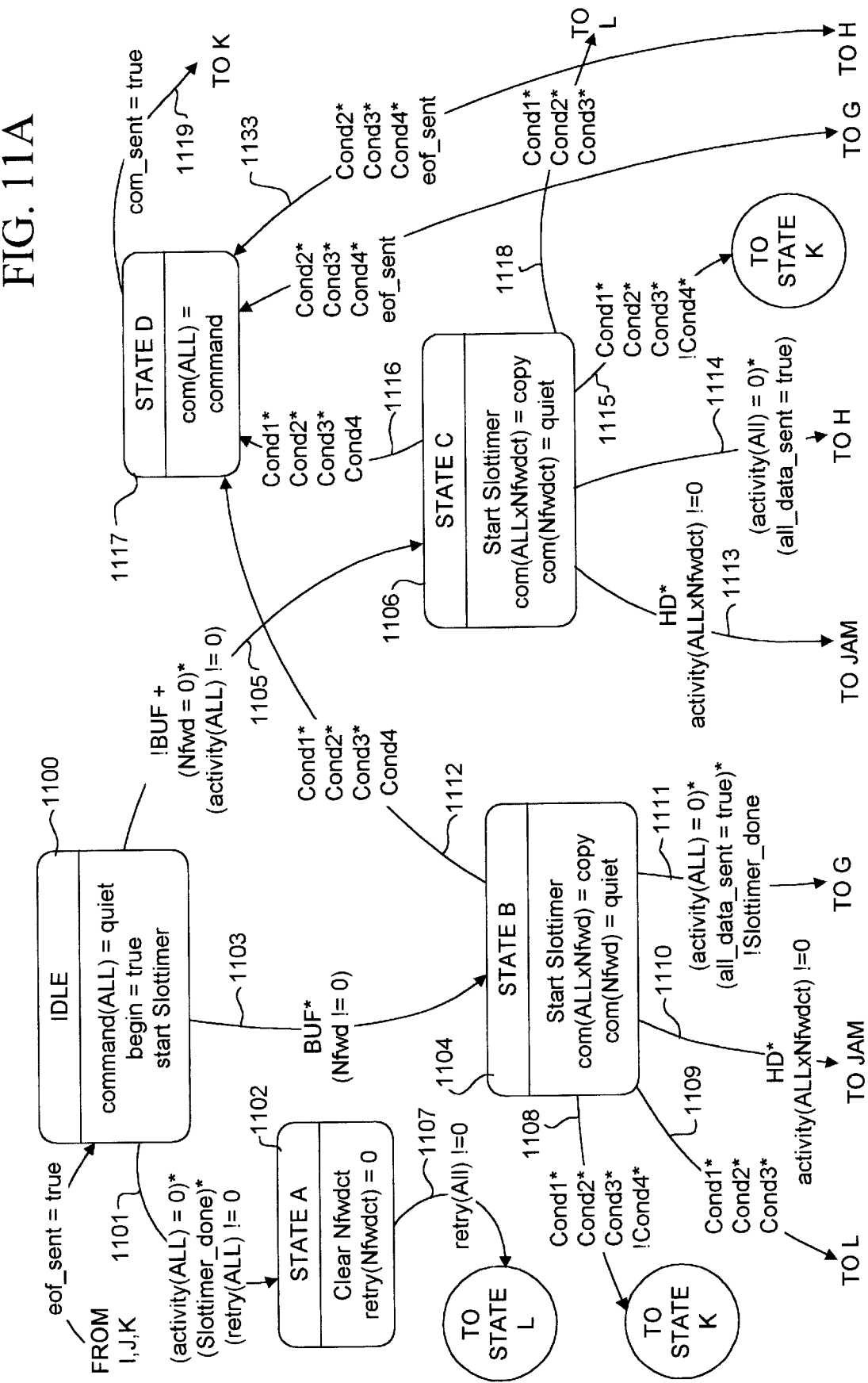
FIGS. 11A–11C are a state diagram for the repeater core transmit function for half duplex, full duplex and frame buffer modes.
Figure 11B:
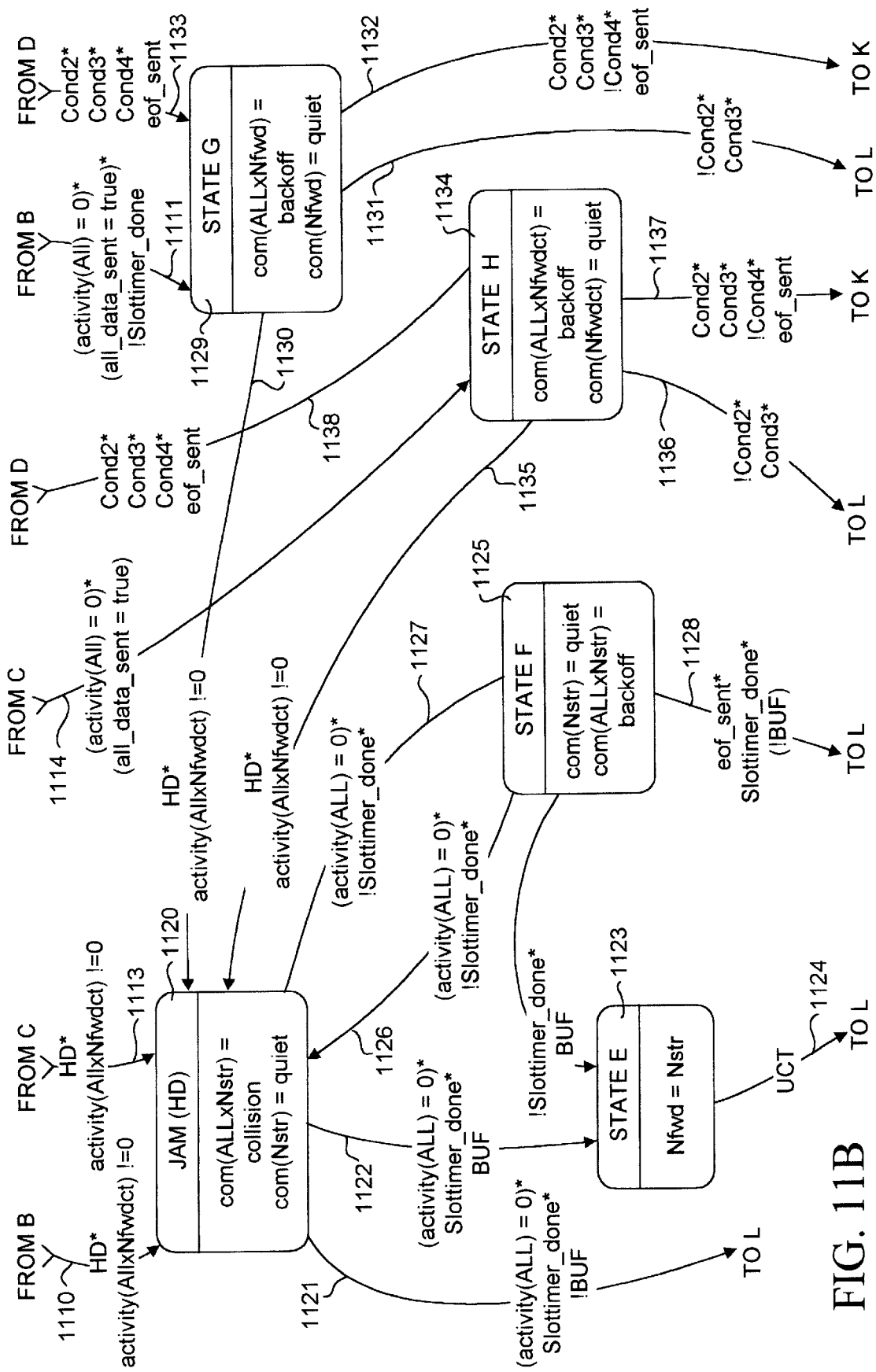
Figure 11C:
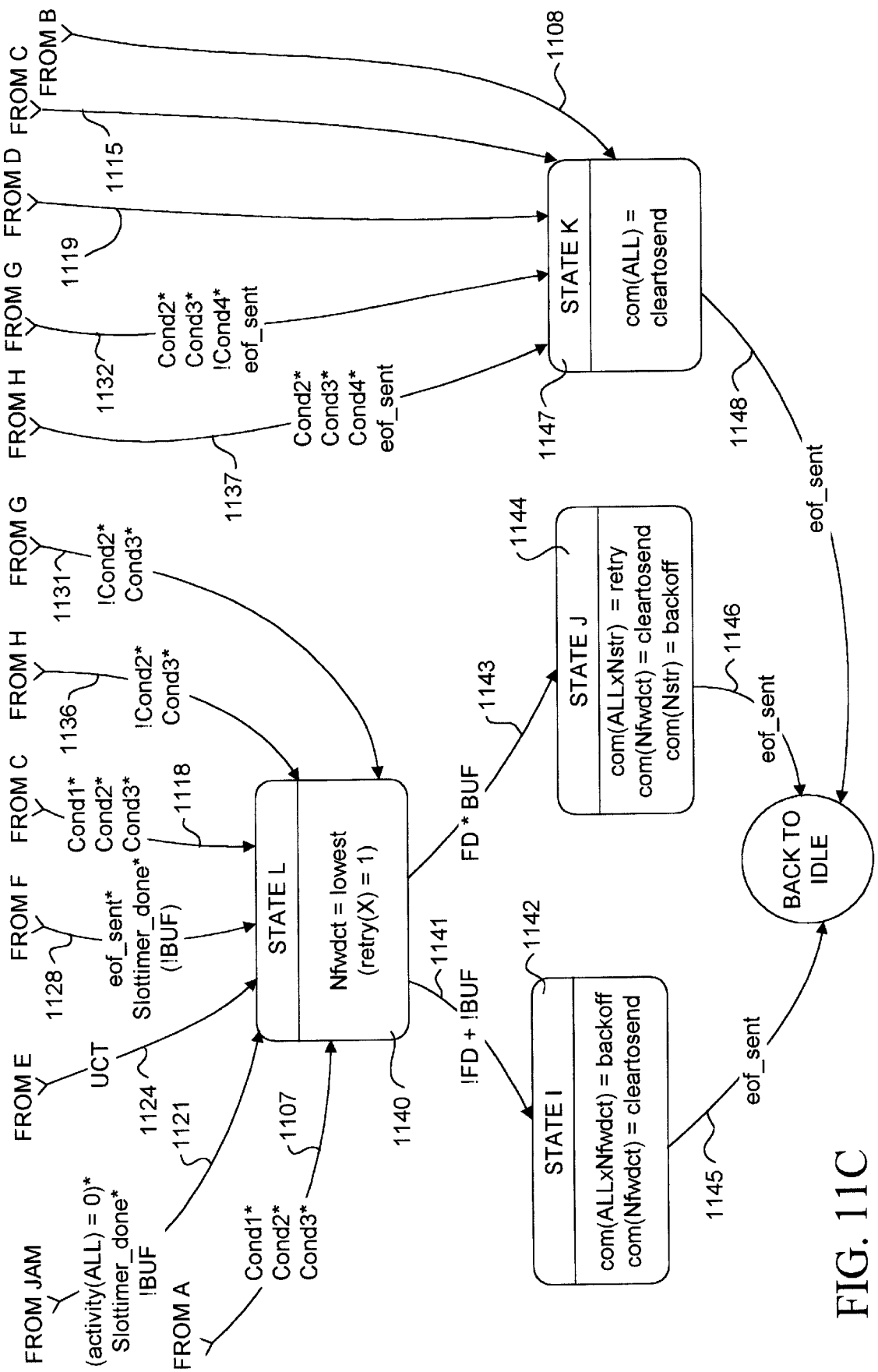

FIGS. 11A–11C illustrates the transmit operation for the core state machine in the repeater unit. The parameter "Nfwdct" corresponds to a port which has been selected for forwarding a packet in a cut through mode, directly from the receiving port to all other ports except the receiving port. The parameter "Nfwd" corresponds to a port having a buffered packet, and assigned priority for forwarding the buffered packet. The parameter "Nstr" corresponds to a current packet having been selected for storing an incoming packet into the buffer of the repeater unit. Also, in FIGS. 11A–11C, Cond 1=(activity(ALL)=0)*(all_data_sent=true); Cond 2=(retry(ALL)=0); Cond 3=(slot timer_done); Cond 4=(newlink=true). The states and transitions out of each of the states are described as follows:

IDLE state 1100

The IDLE state 1100 results in issuance of a quiet command (ALL) ports, sets the parameter begin=true and starts the slot timer. Transitions out of the IDLE state include a transition on line 1101 to STATE A 1102. The transition on line 1101 occurs when there is no activity sensed by the repeater, the slot timer is done, and the retry register has at least one entry which is not reset. A transition on line 1103 occurs out of the IDLE state 1100 to STATE B 1104, when the repeater unit includes a frame buffer, and a packet from port Nfwd resides in the buffer.

A transition occurs on line 1105 state 1100 out of the IDLE to STATE C 1106. The transition on line 1105 occurs when no buffer is present, or when no stored packet is present in the buffer and activity has been detected on at least one of the ports.

STATE A 1102

In STATE A, the repeater core clears the parameter Nfwdct, and clears the entry in the retry register for the port Nfwdct. Transition out of STATE A occurs on line 1107 if any entries remain set in the retry register. The transition on line 1107 goes to STATE L which is shown in FIG. 11C.

STATE B 1104

In STATE B 1104, the repeater core state machine starts the slot timer, sets the command for all ports except the port having a packet stored in the buffer to copy, and sets the command for the port having the packet stored in the buffer to quiet. This results in repeating the packet out of the buffer for port Nfwd. Transitions out of STATE B include the transition on line 1108 to STATE K shown in FIG. 11C, in the event that no activity is being detected, all data of the current packet has been successfully sent, the retry entries have all been reset, and the slot timer has expired, provided no new link has been added.

A transition occurs on line 1109 out of STATE B to STATE L shown in FIG. 11C, in the event that a packet has been successfully sent, no activity is detected, no retry entries remain set, and the slot timer is done. [Compare this to transition 1108].

A transition occurs on line 1110 out of STATE B to the JAM state shown in FIG. 11B in the event that the repeater is operating in the half duplex mode, and the activity is detected on any port except the port Nfwdct. This corresponds to a collision indication.

A transition occurs on line 1111 out of STATE B to STATE G shown in FIG. 11B, in the event that no activity is being sensed, the packet has been completely sent, and the slot timer has not yet expired.

A transition occurs on line 1112 out of STATE B to STATE D in the event that no activity is being sensed, the packet has been successfully sent, no entries remain set in the retry register, the slot timer has expired, and a new link has been established in the network.

STATE C 1106

In STATE C 1106, the core state machine starts the slot timer, issues the command to all ports except port Nfwdct to copy the packet incoming from port Nfwdct, and issues a command to port Nfwdct=quiet. Transitions occur out of STATE C 1106 across line 1113 to the JAM state in the event half duplex mode is in effect, and activity is sensed on any port except port Nfwdct. A transition out of STATE C 1106 occurs on line 1114 to STATE H shown in FIG. 11B in the event no activity is being sensed, and the packet has been successfully sent.

A transition occurs out of STATE C 1106 on line 1115 to STATE K shown in FIG. 11C, in the event that the packet has been successfully sent, no activity is being sensed, the slot timer has expired, and no new link has been added to the network, and no entries remain set in the retry register. A transition occurs on line 1116 to STATE D 1117 under the same conditions as the transition on line 1115, except that a new link has been added to the network.

A transition out of STATE C 1106 occurs on line 1118 to STATE L shown in FIG. 11C, in the event that a packet is successfully sent, no activity is detected, no entries remain set in the retry register, and the slot timer is expired.

STATE D 1117

In the STATE D 1117 the core state machine issues a command to all ports corresponding to the command for the result of delay parameter negotiation. Transition out of STATE D occurs on line 1119 to the IDLE state 1100 in the event that the command is successfully sent.

JAM state 1120

FIG. 11B illustrates the JAM state 1120. This state is entered from STATE B across line 1110, from STATE C across line 1113, and other states to be described below. In the JAM state 1120, the core state machine issues a command to all ports, except port Nstr in the event a packet is to be stored in the buffer from such port, equal to collision. If port Nstr is receiving a packet to be stored, then it receives the quiet command.

Transitions occur out of the JAM state 1120 on line 1121 in the event that all activity has ceased, the slot timer has expired, and the repeater is not operating in a buffer mode. The transition on line 1121 goes to STATE L shown in FIG. 11C. Also a transition occurs on line 1122 out of the JAM state 1120 in the event that the activity has ceased, the slot timer has expired, and the repeater is operating in the buffered mode. The transition on line 1122 goes to STATE E 1123.

A transition occurs on line 1127 out of the JAM state 1120 to STATE F 1125 in the event that the activity has ceased on all ports, and the slot timer has not expired.

STATE E 1123

In STATE E 1123, the repeater core sets the parameter Nfwd equal to the parameter Nstr. An unconditional transition occurs on line 1124 to STATE L shown in FIG. 11C.

STATE F 1125

In STATE F 1125, the core state machine sets the command for port Nstr=quiet, and sets the command for all other ports=backoff. Transition out of STATE F 1125 occurs on line 1126 to the JAM state, if activity is detected on any port before the slot timer is expired.

A transition occurs on line 1128 out of STATE F 1125 to STATE L, shown in FIG. 11C, in the event that an end of frame delimiter has been successfully sent, the slot timer is expired, and the repeater is not operating in a buffered mode.

STATE G 1129

STATE G 1129 is entered from STATE B 1104 on line 1111. Transitions out of STATE G 1129 occur on line 1130 the JAM state 1120 in the event that the repeater is operating in a half duplex mode, and activity is detected on any port other than Nfwdct. A transition occurs on line 1131 to STATE L shown in FIG. 11C, in the event that at least one entry remains set in the retry register, and the slot timer has expired. A transition out of STATE G 1129 occurs on line 1132 to STATE K shown in FIG. 11C, in the event that all entries in the retry register are reset, the slot timer is expired, and no new link has been added to the network, after a successful end of frame delimiter is sent. Finally, a transition occurs on line 1133 from STATE G 1129 to STATE D 1117 shown in FIG. 11A under the same conditions as the transition 1132, except that a new link has been added to the network.

STATE H 1134

STATE H 1134 is entered from STATE C 1106 on transition 1114. Transition out of STATE H 1134 occurs on line 1135 to the JAM state in the event that the repeater is operating in the half duplex mode, and activity is detected on any port except Nfwdct. Also, a transition occurs on line 1136 out of STATE H 1134 to STATE L shown in FIG. 11C in the event that an entry remains set in the retry register, and the slot timer is expired. A transition occurs on line 1137 to STATE K shown in FIG. 11C, in the event that the retry register has been reset for all ports, the slot timer is expired, and no new link has been added to the network, and the end of frame delimiter is successfully sent. A transition occurs on line 1138 to STATE D 1117 under the same conditions as the transition of 1137, except that a new link is being added to the network.

FIG. 11C includes the balance of the states in the state diagram of FIGS. 11A–11C.

STATE L 1140

STATE L 1140 is entered from STATE A across transition 1107, entered from the JAM state 1120 across transition 1121, entered from STATE E 1123 across transition 1124, entered from STATE F 1125 across transition 1128, entered from STATE C 1106 across transition 1118, entered from STATE H 1134 across transition 1136, and entered from STATE G 1129 across transition 1131. In STATE L 1140, the parameter Nfwdct is set to the lowest port number in which the retry parameter has been set according to one simple priority scheme. Other priority schemes can be applied in STATE L as suits a particular implementation.

Transitions out of STATE L occur on line 1141 to STATE I 1142 in the event that the repeater is not in the full duplex mode, or not in the buffered mode. A transition occurs on line 1143 to STATE J 1144 in the event that the repeater is both in full duplex and buffered modes.

STATE I 1142

In STATE I 1142, the repeater core issues a command to all ports except port Nfwdct to backoff, and issues the clear to send command to port Nfwdct. A transition out of STATE I 1142 occurs on line 1145 after the end of frame delimiter is successfully sent, back to the IDLE state 1100 of FIG. 11A.

STATE J 1144

In STATE J 1144, the repeater core issues the command to wait and retry within this collision episode to all ports except Nstr, issues the command to port Nfwdct=clear to send, and issues a command to port Nstr to backoff until next CTS after this collision episode. During this state, the packet stored in the buffer is forwarded. A transition out of STATE J 1144 occurs on line 1146 after successful sending of end of frame delimiter, back to the IDLE state 1100 of FIG. 11A.

STATE K 1147

STATE K 1147 is entered across transition 1115 from STATE C 1106, across transmit 1108 from STATE B 1104, across transition 1119 from STATE D 1117, across transition 1137 from STATE H 1134, and across transition 1132 from STATE G 1129. In STATE K 1147, the repeater core issues a command to all ports=to clear to send. Transition out of STATE K 1147 occurs on line 1148 after successful transmission of the end of frame delimiter, back to the IDLE state 1100.

Figure 12:
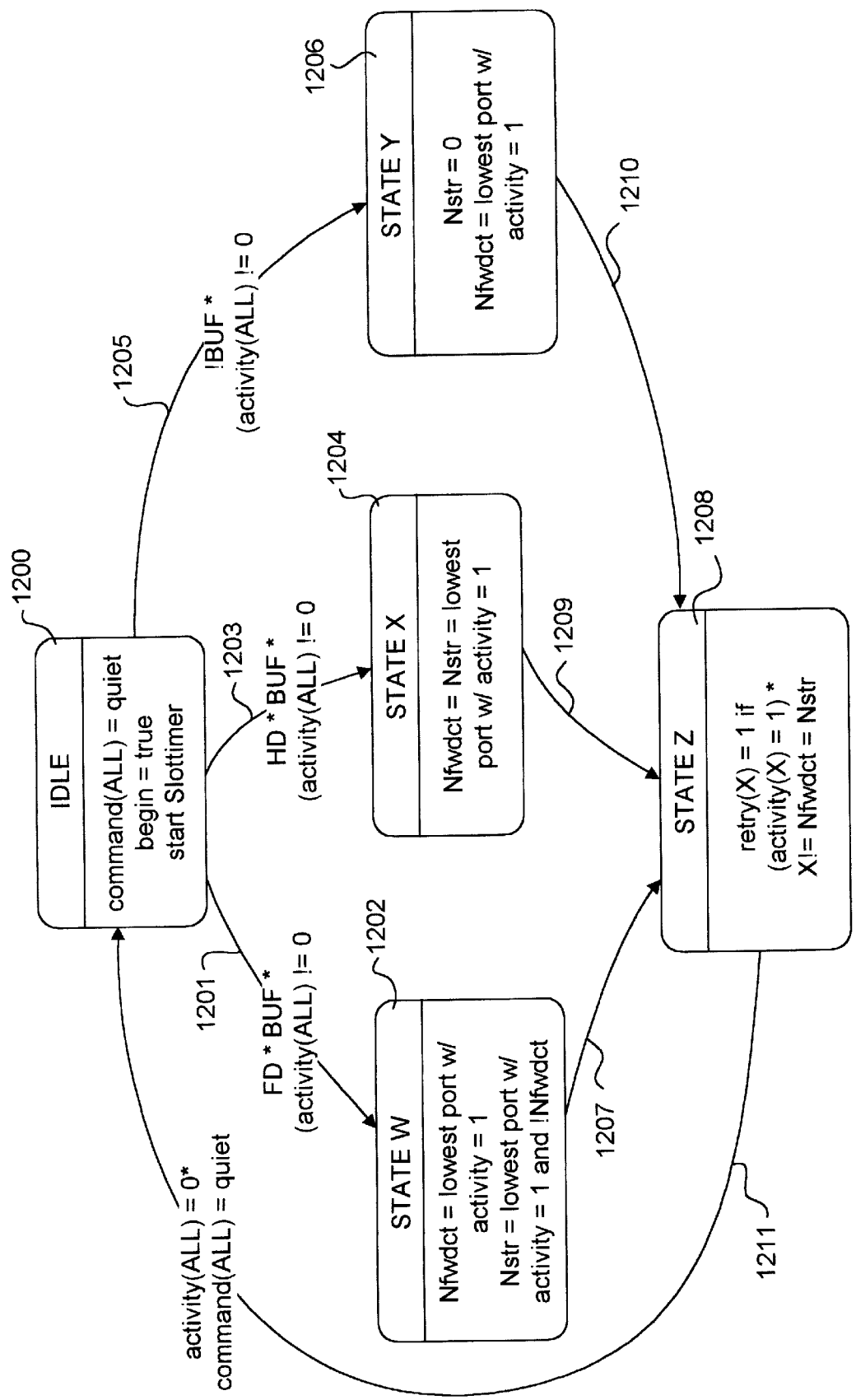
FIG. 12 is a state diagram for the repeater core receive functions for half duplex, fill duplex and frame buffer modes.

FIG. 12 illustrates the core state machine operation in a receive mode for a repeater unit capable of handling the half duplex, half duplex with frame buffer, full duplex and full duplex with frame buffer modes. Each of the states and transitions out of the states are described below.

IDLE STATE 1200

In the IDLE state 1200, the repeater core issues a command to all ports=to quiet, sets the begin parameter true and starts the slot timer. Transition out of the IDLE state 1200 occurs on line 1201 to STATE W 1202 if the repeater is operating in the buffered full duplex mode, and activity has been detected. A transition occurs out of the IDLE state on line 1203 to the STATE X 1204, in the event that the repeater is operating in a half duplex buffered mode, and activity has been detected. A transition occurs on line 1205 to STATE Y 1206 in the event that no buffer is being used in the repeater, and activity has been detected.

STATE W 1202

In STATE W 1202, the parameter Nfwdct is set to the lowest port with activity detected, and the parameter Nstr is set to the lowest port with activity detected, and not equal to the Nfwdct. Thus, one port is selected for cut through forwarding, while the other port is selected for loading into the buffer.

A transition occurs out of STATE W on line 1207 unconditionally to STATE Z 1208.

STATE X 1204

In STATE X 1204, the repeater core sets the parameter Nfwdct to the parameter Nstr, and to the lowest port having detected activity. A transition out of STATE X 1204 occurs on line 1209 to STATE Z 1208 unconditionally.

STATE Y 1206

In STATE Y 1206, the repeater core sets the parameter Nstr=0(a null value), and sets the parameter Nfwdct to the lowest port with detected activity. Transition occurs out of STATE Y 1206 on line 1210 to STATE Z 1208 unconditionally.

STATE Z 1208

In STATE Z 1208, the repeater core sets the retry entry for port X to 1, if activity is detected on that port, and X is not equal to port Nfwdct or port Nstr. The transition out of STATE Z occurs on line 1211 to the IDLE state 1200, when activity is no longer detected, and a command for all ports=quiet.

It will be understood that the state diagrams provided in FIGS. 7–9 and 11A–11C and 12 can be implemented in a variety of formats, and using a variety of implementation techniques. A preferred system, the state diagrams are implemented in custom integrated circuit designs in the repeater housing. The size of the frame buffer for a repeater based collision resolution system according to the present invention is at least the maximum packet size plus the maximum bit count during an interframe gap, and can be on the order of 1500 bytes. Thus, the frame buffer is easily implemented in a single integrated circuit with the state machine, allowing for low cost efficient implementation of the scalable CSMA/CD repeater of the present invention.

Figure 13:
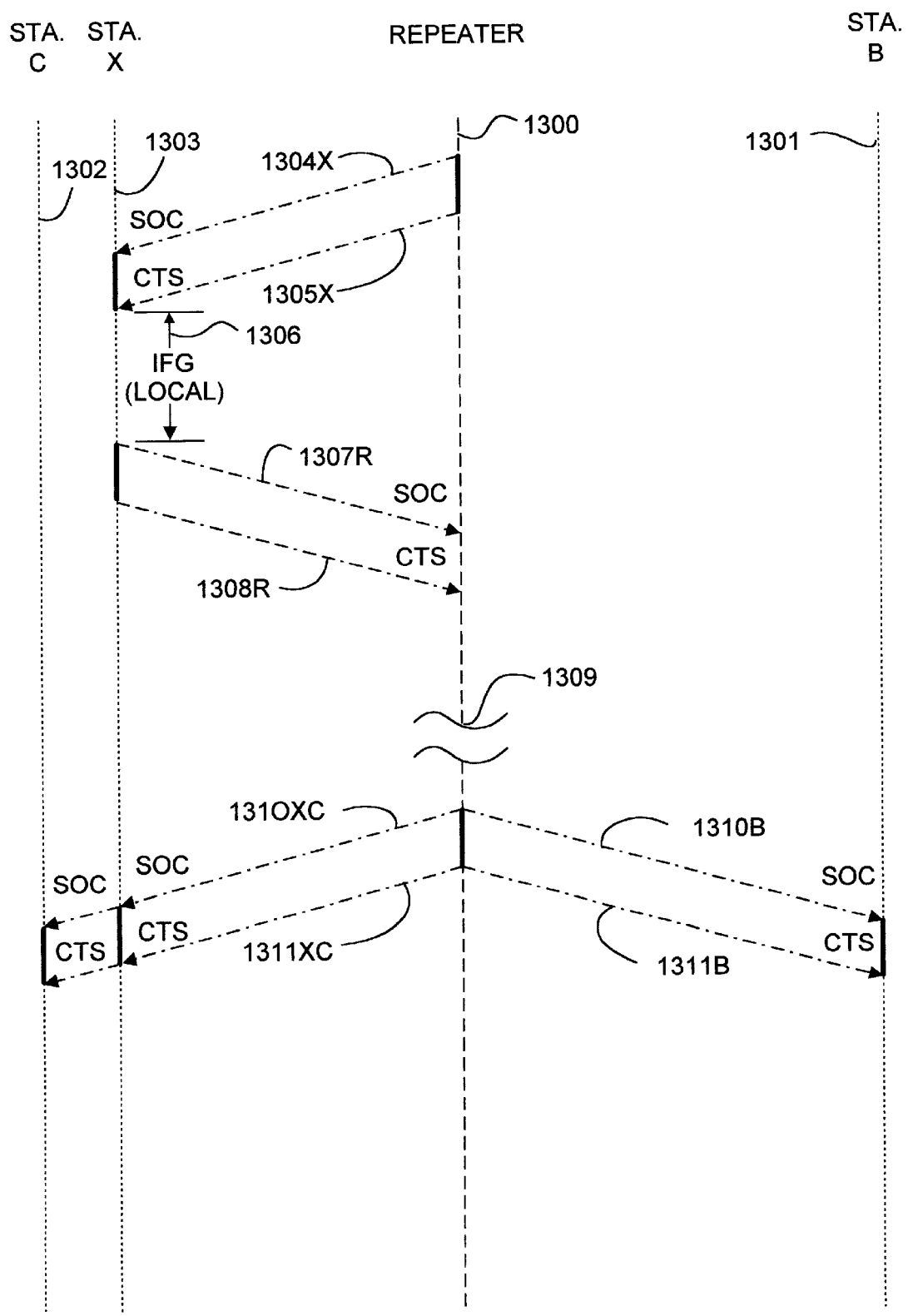
FIG. 13 is a "time and space" diagram for a delay parameter negotiation sequenced according to the present invention.

FIG. 13 provides a time and space diagram for the delay parameter negotiation process according to the present invention. In the diagram, the repeater is represented by the vertical line 1300, the position of station B is represented by vertical line 1301. The position of station C is represented by vertical line 1302, and position of station X, corresponding to a new link to the repeater, is represented by vertical line 1303. Upon detection of the new link, the repeater core state machine issues a command packet like that of FIG. 10 with a SOC start of frame delimiter to the new station, station X, as represented by arrow 1304X. At the end of the command packet, as represented by arrow 1305X, the new station X receives the clear to send command.

The local MAC unit waits its interframe gap interval as represented by interval 1306, and begins transmission of a response on arrow 1307R, carrying the parameters discussed above with reference to FIG. 10. Again, the beginning of frame delimiter is the SOC delimiter indicating a command packet. Command packet sent by the new station, station X, ends as represented by arrow 1308R with a clear to send command. The command and response sequence (arrow 1304X through arrow 1308R), occurs only on the port connected to station X, without interfering with normal operation of the other ports on the repeater.

The repeater receives the information from the packet, and updates the delay parameters for the network. The repeater waits until the network is quiet, or a collision sequence is ended, as represented by the interval 1309, and then broadcasts updated parameters to all stations in the network as represented by arrows 1310XC and 1310B. The broadcast packet is terminated with a clear to send command as represented by arrow 1311XC and 1311B. At this point, all of the MAC units in the network are updated with the appropriate delay parameters.

Figure 14:
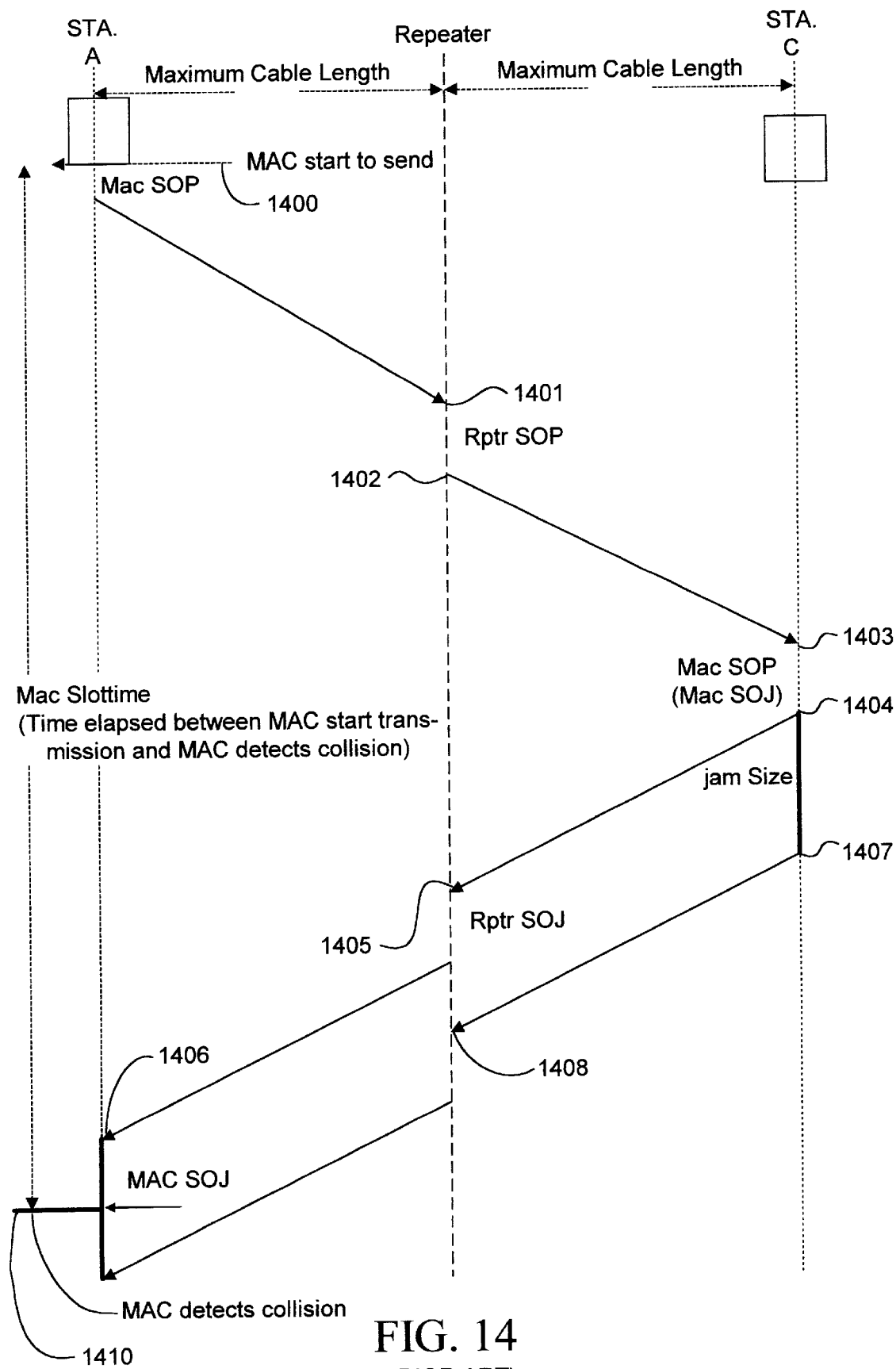
FIG. 14 illustrates a prior art slot time.
Figure 15:
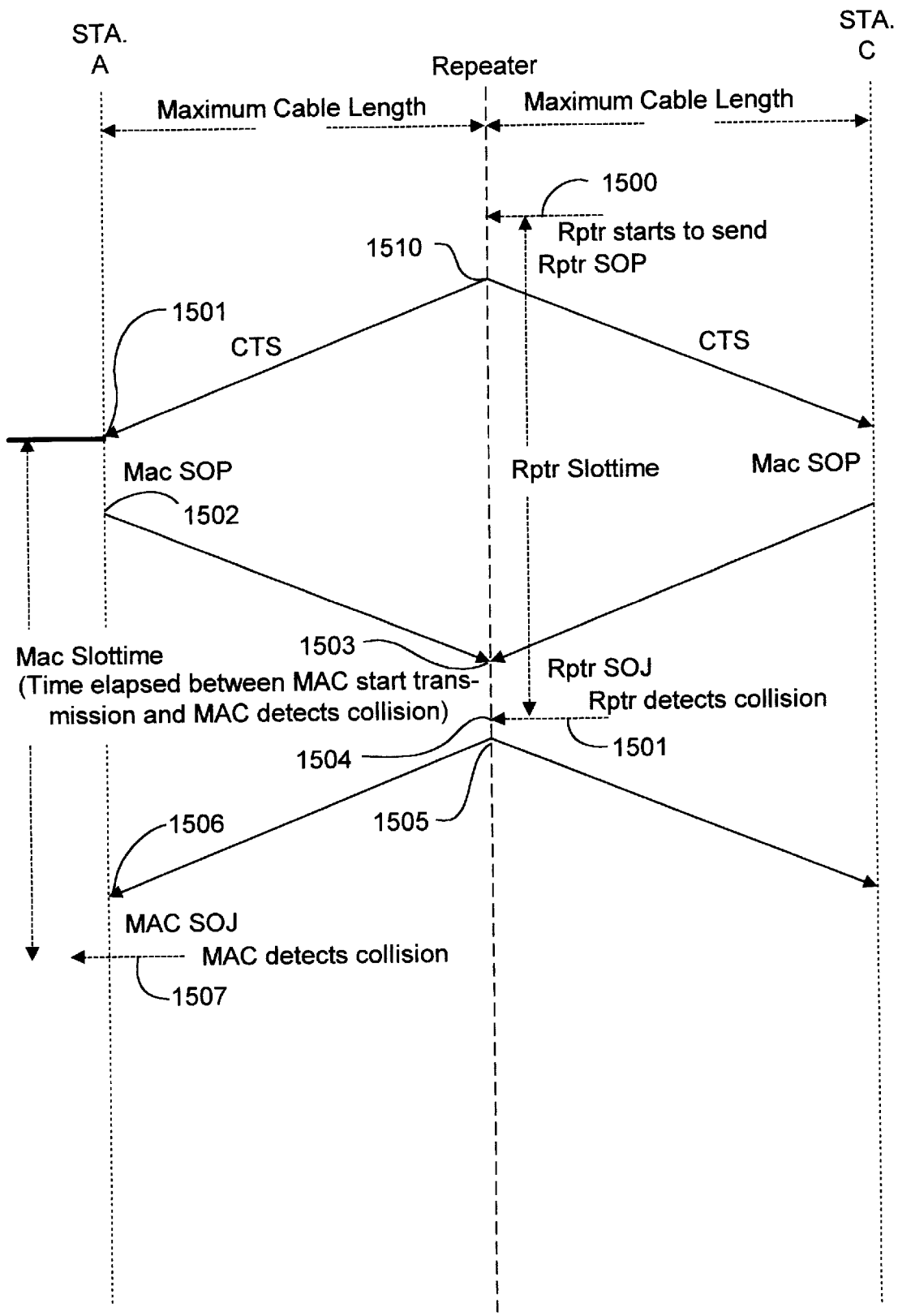
FIG. 15 illustrates a slot time according to the present invention.

FIGS. 14 and 15 illustrate the improvements provided by the use of the delay parameter negotiation logic of the present invention, and the repeater based collision resolution as reflected in the slot time parameter.

FIG. 14 illustrates the prior art slot time. The slot time begins with a MAC unit starting to send a packet at point 1400. The packet is transmitted along the maximum cable length to the repeater at point 1401. After the repeater start of packet delay, at point 1402, the packet is transmitted out the maximum cable length to a remote MAC unit at point 1403. After the MAC start of packet or start of jam delay, at point 1404, the packet is forwarded out of the remote MAC back to the repeater where it is received at point 1405. This packet is then sent back to the initiating MAC where it is received at point 1406. The end of jam after detection of collision at the remote MAC occurs at point 1407. The jam packet is received by the repeater at point 1405 and transmitted to the original MAC unit, where it is received beginning at point 1406, until the end of the jam packet at point 1409. Upon receipt of the jam packet at point 1406, and after start of jam delay, the MAC unit slot time is determined at point 1410. This slot time defines the MAC unit slot time which corresponds to the time elapsed at a MAC unit between start of transmission and detection of a collision from a MAC unit the maximum cable length away.

FIG. 15 illustrates the slot time according to the present invention. According to the present invention, a repeater slot time is the time between a repeater start to transmit at point 1500, and a repeater detect collision at point 1501. This includes the repeater start of packet delay 1510 from point 1501, the time it takes to repeat the message out a maximum cable length to a remote MAC unit at point 1501, plus the MAC start of packet delay to point 1502, the time it takes the MAC to return the packet to the repeater at point 1503, and the repeater start of jam delay to point 1504.

The MAC slot time includes the time from start of receipt of the packet at point 1501, the MAC start of packet delay to point 1502, transmission time to the repeater at point 1503, the repeater start of jam delay to point 1505, the amount of time it takes the repeater to return the packet to the originating MAC at point 1506, plus the start of jam delay at the MAC unit, ending at point 1507. Thus FIGS. 14 and 15 graphically illustrate the substantial reduction in slot time provided by the present invention.

The following provides an outline comparing the prior art CSMA/CD scheme with certain modifications provided by the present invention:

Prior Art Scheme (MAC to start transmit independently, MAC to retry after random waiting time.)
1. MAC initiates packet transmission independently.
2. Repeater detects collision and jam.
3. MAC detects collision, jam and with random backoffs.
4. MAC retries the same packet independently.

Result of Prior Art Scheme:
I. Maximum time for MAC detect collision after start transmission is round trip (RT) delay from MAC through repeater to another MAC and back through repeater itself.
II. Collision may result from independent random retries form each MAC.
III. Gaps between retries from different MAC is random with fixed upper limit.
IV. Gaps between retries from the same MAC is random with fixed upper limit.
V. Statistically fair—capturing effect with increasing slot time.

Modification 1 of the Present Invention (Repeater coordinate MAC to start transmission within fixed time. MAC to retry after random waiting time.)
1. Repeater enables packet to transmit from all parties.
2. MAC transmits the packet after enable.
3. Repeater detects collision and jam.
4. MAC detects collision, jam and randomly backoff.
5. MAC retries the same packet.
6. After all colliding parties retried, enable packet transmission from all parties.

Result of Modification 1:
I. Maximum time for MAC to detect collision after start transmission is RT delay between MAC and repeater. - - - ½ delay
II. Collision may result from independent random retries from each MAC.
III. Gaps between retries from different MAC is random with fixed upper limit.
IV. Gaps between retries from the same MAC is random with fixed upper limit.
V. Statistically fair.

Modification 2 of the Present Invention (Repeater coordinate MAC to start transmission within fixed time. Each port of the repeater backoff random numbers of slot times, and then reenable the corresponding port, in effect moving the random backoff from MAC to repeater.)
1. Repeater enables packet transmission from all parties.
2. MAC transmits packet on enable.
3. Repeater detects collision, record all colliding parties and jam.
4. After jam, repeater causes each port to backoff randomly and enables corresponding MAC afterwards.
5. MAC detects collision and wait for enable.
6. MAC retries the same packet on enable.
7. After all colliding parties retried, repeater enables packet transmission from all parties.

Result of Modification 2:
I. Maximum time for MAC to detect collision after start transmission is RT delay between MAC and repeater. - - - ½ delay.
II. Collision may result from independent random backoff and reenable at each port of the repeater.
III. Gaps between retires from different MAC is random with fixed upper limit.
IV. Gaps between retries from the same MAC is random with fixed upper limit.
V. Statistically fair—capturing effect with increasing slot time.
VI. Logic for retry is to replicate the backoff logic in MAC one for each port in the repeater.

Modification 3 of the Present Invention (Repeater coordinates MAC to start transmission within fixed time. Repeater randomly decides time to enable each colliding MAC to retry after collision. All MACs involved in the collision retry one at a time until all send one packet.)
1. Repeater enables packet transmission from all parties.
2. MAC transmits packet on enable.
3. Repeater detects collision, recording all colliding parties and jam.
4. Repeater, after jam, randomly selects and enables the next to retry from all colliding parties.
5. MAC detects collision and waits for enable.
6. MAC retries the same packet on enable.
7. After all colliding parties retried, enable packet transmission from all parties.

Result of Modification 3:
I. Maximum time for MAC to detect collision after start transmission is RT delay between MAC and repeater. - - - ½ delay
II. No collision may result from the coordinated retries from each MAC—0 collision on retries.
III. Gaps between retries from different MAC is controlled to be minimum.
IV. Gaps between retries from the same MAC is zero.—One retry at most.
V. Logic for sequencing the retries is more complicated (random pick).
VI. Guaranteed fairness at any time—no port can capture (hog) the media with increasing slot time.

Modification 4 of the Present Invention (Repeater coordinates MAC to start transmission within fixed time. Repeater enables each colliding MAC to retry by a fixed order until all colliding MACs have retried.)
1. Repeater enables packet transmit.
2. MAC transmits packet on enable.
3. Repeater detects collision, records all colliding parties and jam.
4. Repeater after jam, selects and enables the next to retry from all colliding parties by a fixed order.
5. MAC detects collision and waits for enable.
6. MAC retries the same packet on enable.
7. After all colliding parties retried, enable packet transmission from all parties.

Result of Modification 4:
I. Maximum time for MAC to detect collision after start transmission is RT delay between MAC and repeater. - - - ½ delay.

II. No collision may result from the coordinated retries from each MAC—0 collision on retries.
III. Gaps between retries from different MAC is controlled to be minimum.
IV. Gaps between retries from the same MAC is zero. - - - One retry at most.
V. Logic for sequencing the retries is minimum (fixed ordering).
VI. Guaranteed fairness at any time—no party can capture (hog) the media with increasing slot time.

Accordingly, an improved CSMA/CD repeater has been provided which allows for scaling of the CSMA/CD protocol to higher data rates, more varied communication media, faster MAC processes and more flexible configurations in the repeater.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A network device, comprising:
   a plurality of ports;
   a repeater unit including logic coupled to the plurality of ports which monitors activity on the plurality of ports
   i) to transmit a packet received without collision on one port to all other enabled ports in the plurality of ports, and
   ii) to detect a collision between packets received on a set of ports in the plurality of ports, to identify the ports in the set of ports, and to issue commands to end stations coupled to ports in the set of ports to resolve the collision, the commands indicating to the ports in the set of ports to retry sending of a packet.

2. The network device of claim 1, including:
   delay parameter negotiation logic, coupled to the repeater unit and the plurality of ports, which communicates with end stations coupled to the plurality of ports to determine delay parameters for use by the repeater unit to detect and resolve collisions.

3. The network device of claim 1, wherein the repeater unit includes logic to jam the plurality of ports in response to detection of a collision by transmitting jam packets to ports in the plurality of ports, and the commands comprise a control field in the jam packets.

4. The network device of claim 3, wherein the control field comprises an end of frame control field which carries a command to the end station.

5. The network device of claim 3, wherein the jam packet has a length as long as a longer of a time from detection of a collision to a time that all ports are quiet or a slot time defined as a delay parameter long enough to allow for a round trip transmission of a packet from a port in the plurality of ports to an end station and back.

6. The network device of claim 1, wherein the plurality of ports comprise half-duplex ports, and the repeater unit includes logic to jam the plurality of ports in response to detection of a collision by transmitting jam packets to the plurality of ports, and the commands comprise a control field in the jam packets.

7. The network device of claim 6, wherein the control field comprises an end of frame control field which carries a clear-to-send command to one end station coupled to the set of ports, and a backoff command to other ports in the plurality of ports, so that the one end station receiving the clear-to-send command in the end of frame control field of the jam packet has an opportunity to send a packet without collision after the jam packet.

8. The network device of claim 1, including a frame buffer coupled to the plurality of ports and the repeater unit to buffer a packet received on a port in the set of ports.

9. The network device of claim 8, wherein the plurality of ports comprise half-duplex ports, and the repeater unit includes logic to jam the plurality of ports in response to detection of a collision by transmitting jam packets to the plurality of ports, and logic to transmit a buffered packet from the frame buffer after the jam packet, and the commands comprise a control field in the jam packets and a control field in the buffered packet.

10. The network device of claim 9, wherein the control field comprises an end of frame control field which carries a clear-to-send command to one end station coupled to the set of ports other than the port from which the buffered packet was received, and a backoff command to other ports in the plurality of ports, so that the one end station receiving the clear-to-send command in the end of frame control field of the buffered packet has an opportunity to send a packet without collision after the buffered packet.

11. The network device of claim 1, wherein the plurality of ports comprise full-duplex ports, and the repeater unit includes logic to transmit a packet received on a first selected port in the set of ports to the plurality of ports during detection of a collision, and the commands comprise a control field in the transmitted packet.

12. The network device of claim 11, including a frame buffer coupled to the plurality of ports and the repeater unit to buffer a packet received on a second selected port in the set of ports.

13. The network device of claim 12, wherein the control field comprises an end of frame control field which carries a clear-to-send command to one end station coupled to a third selected port in the set of ports other than the first and second selected ports, and a wait command to other ports in the plurality of ports, so that the one end station receiving the clear-to-send command in the end of frame control field of the packet from the first selected port has an opportunity to send a packet without collision after receiving the packet from the first selected port.

14. The network device of claim 13, wherein the control field carries a wait and retry command to ports in the set of colliding ports, other than the first, second and third selected ports indicating to end stations to retry after waiting for a clear-to-send command.

15. The network device of claim 1, wherein the repeater logic assigns opportunities to retry packets to ports in the set of ports, and said opportunities last a slot time defined as a delay parameter long enough to allow for a round trip transmission of a packet from a port in the plurality of ports to an end station and back.

16. The network device of claim 15, including:
   delay parameter negotiation logic, coupled to the repeater unit and the plurality of ports, which communicates with end stations coupled to the plurality of ports to determine the slot time.

17. The network device of claim 16, wherein the delay parameter negotiation logic communicates with end stations coupled to the plurality of ports to determine an inter-frame gap time which the repeater unit waits between an end of a packet and a transmission of another packet.

18. The network device of claim 1, wherein the repeater unit includes logic which issues clear-to-send commands in a sequence giving all the ports in the set of ports respective opportunities to send packets, and after all ports in set of ports have had an opportunity to send a packet, issues clear-to-send commands to all enabled ports in the plurality of ports.

19. The network device of claim 1, including:

delay parameter negotiation logic, coupled to the repeater unit and the plurality of ports, which upon detection of a new link to an end station on a port, sends a delay parameter packet to the end station, receives a response packet from the end station, and updates delay parameters for the network in response to the response packet.

20. The network device of claim 19, wherein the delay parameter negotiation logic includes logic to broadcast updated delay parameters to end stations in the network.

21. The network device of claim 1, wherein the repeater unit includes logic to periodically assign opportunities to send packets, if no activity is detected on the plurality of ports, to all end stations coupled enabled ports in the plurality of ports.

22. A network device, comprising:

a plurality of ports;

a repeater unit including logic coupled to the plurality of ports which monitors activity on the plurality of ports
   i) to periodically issue commands to all enabled ports in the plurality of ports in parallel indicating clear to send status to end stations coupled to the plurality of ports,
   ii) to transmit a packet received without collision on one port to all other enabled ports in the plurality of ports, and
   ii) to detect a collision between packets received on a set of ports in the plurality of ports, to identify the ports in the set of ports, and to issue commands to end stations coupled to ports in the set of ports to resolve the collision, the commands assigning opportunities to the ports in the set of ports to send a packet without collision; and delay parameter negotiation logic, coupled to the repeater unit and the plurality of ports, which communicates with end stations coupled to the plurality of ports to determine delay parameters for use by the repeater unit to detect and resolve collisions.

* * * * *